United States Patent
Poustchi

(10) Patent No.: US 7,616,749 B2
(45) Date of Patent: Nov. 10, 2009

(54) CALL PARK AND CALL PARK PICKUP SYSTEMS, METHODS AND NETWORK DEVICES

(75) Inventor: Behrouz Poustchi, Kanata (CA)

(73) Assignee: Avaya Canada Corp., Basking Ridge, NJ (US)

( * ) Notice: Subject to any disclaimer, the term of this patent is extended or adjusted under 35 U.S.C. 154(b) by 1044 days.

(21) Appl. No.: 10/851,107

(22) Filed: May 24, 2004

(65) Prior Publication Data

US 2004/0240656 A1 Dec. 2, 2004

Related U.S. Application Data

(60) Provisional application No. 60/473,877, filed on May 29, 2003.

(51) Int. Cl.
 *H04M 3/42* (2006.01)
(52) U.S. Cl. .............................. 379/211.02; 379/212.01
(58) Field of Classification Search ............. 379/265.01
 See application file for complete search history.

(56) References Cited

U.S. PATENT DOCUMENTS

| | | | | |
|---|---|---|---|---|
| 4,862,353 | A * | 8/1989 | Williams | 710/62 |
| 5,963,620 | A | 10/1999 | Frankel et al. | 379/93.05 |
| 6,188,907 | B1 * | 2/2001 | Reding et al. | 455/459 |
| 6,236,716 | B1 * | 5/2001 | Marcus et al. | 379/88.15 |
| 6,473,437 | B2 * | 10/2002 | Stumer | 370/462 |
| 6,574,467 | B1 * | 6/2003 | Jonsson | 455/414.1 |
| 6,650,748 | B1 * | 11/2003 | Edwards et al. | 379/266.04 |
| 7,006,614 | B2 * | 2/2006 | Feinberg et al. | 379/164 |
| 7,295,669 | B1 * | 11/2007 | Denton et al. | 379/265.02 |
| 2001/0028708 | A1 * | 10/2001 | Tanaka et al. | 379/156 |
| 2002/0130791 | A1 * | 9/2002 | Stumer | 340/932.2 |
| 2004/0001579 | A1 * | 1/2004 | Feinberg et al. | 379/156 |

FOREIGN PATENT DOCUMENTS

| | | | |
|---|---|---|---|
| EP | 0 967 764 | A2 | 10/1999 |
| EP | 0 967 764 | A3 | 10/1999 |
| EP | 0 982 919 | A2 | 1/2000 |
| EP | 0 982 919 | A3 | 1/2000 |
| WO | WO 97/31492 | | 2/1996 |

OTHER PUBLICATIONS

ITU-T: "ITU-T H.450-2" Online! Feb. 1998, International Telecommunication Union, XP002311122 Retrieved from the Internet: URL: http://mirror.itu.int/dms/pay/itu-t/rec/h/T-REC-H.450.2-1998024-I PDF-E.pdf.

(Continued)

*Primary Examiner*—Creighton Smith
(74) *Attorney, Agent, or Firm*—Muncy, Geissler, Olds & Lowe, PLLC

(57) ABSTRACT

In a call park and call park pickup system, a plurality of network devices have local call park functionality. For call park of a call between two network devices initiated at one of the network devices and call park pickup of the call at a third network device, the local call park functionality is used to provide messaging between the three network devices for parking and picking up the call without the need of central processing equipment for providing call park and call park pickup functionality.

96 Claims, 18 Drawing Sheets

OTHER PUBLICATIONS

ITU-T: "ITU-T H.450.5" May 1999, International Telecommunication Union, XP002311123 Retrieved from the Internet: URL: http://mirror.itu.int/dms/pay/itu-t/rec/h/T-REC-H.450.5-199905-I PDF-E.pdf.

"Erratum 2 Recommendation ITU-T H.450.5 (May 1999)" Apr. 22, 2002, International Telecommunication Union, Geneva, XP002311124 Retrieved from the Internet: URL: http://mirror.itu.int/dms/pay/itu-t/rec/h/T-REC-H.450-199905-I PDF-E.pdf.

* cited by examiner

| DN | MAC ADDRESS | IP ADDRESS | DEVICE STATUS | BACKUP 1 | BACKUP 2 |
|---|---|---|---|---|---|
| 201 | 00-05-78-6B-44-A7 | 192.168.1.1 | 1 | 202 | 205 |
| 202 | 00-05-78-6B-44-A8 | 192.168.1.2 | 1 | 201 | 203 |
| 203 | 00-05-78-6B-44-A9 | 192.168.1.3 | 1 | 202 | 204 |
| 204 | 00-05-78-6B-44-B0 | 192.168.1.4 | 1 | 203 | 205 |
| 205 | 00-05-78-6B-44-B1 | 192.168.1.5 | 1 | 201 | 204 |
| T01 | 00-05-78-6B-44-B2 | 192.168.1.6 | 1 | | |

CALL PARK AND CALL PARK PICKUP SYSTEMS, METHODS AND NETWORK DEVICES

RELATED APPLICATION

This Application claims the benefit of U.S. Provisional Application 60/473,877 filed May 29, 2003 which is hereby incorporated herein by reference.

FIELD OF THE INVENTION

This invention relates generally to call park and call park pickup systems, methods and network devices in communications networks.

BACKGROUND OF THE INVENTION

Some modern communications solutions are based on VoIP (Voice-over IP (Internet Protocol)) technology, which is the transmission of calls over a data network based on the IP. The communication is in the form of packet data and thus there is no fixed connection as there would be in the case of switched networks. The communication can be text, voice, graphics or video. In order to simplify IP communication problems, standards have been developed and adopted in the industry. Examples of such standards are H.323 (Packet based communication systems) and SIP (Session Initiation Protocol). These standards are followed when designing new hardware and software. The SIP standard covers the technical requirements to set-up, modify and tear down multimedia sessions over the Internet. A multimedia communication session between two endpoints will be referred to as a call.

Communication solutions, whether they be switch based or packet based, are defined and designed for a specific number of users and call processing capacity, generally defined by the number of ports (telephone terminations), and the amount of processing available on a central processing equipment that provides routing and call processing functionality. Hence, equipment vendors generally develop and market versions of the same product for different customer size and needs. However, a customer needs to upgrade to larger central processing equipment once the number of ports required and/or call-processing requirements exceed the capacity of the central processing equipment.

Current multimedia communication systems use a central processing equipment and simple user terminal sets. These simple user terminal sets are referred to as "stimulus terminals" as they simply send user stimuli such as key presses to the central processing equipment. In large systems, the central processing equipment is generally a very powerful computer controlling a number of functions on circuit boards called line cards, which connect telephone sets to the computer. The central processing equipment receives hook-switch information and key presses known in the art as DTMF (Dual Tone Multi-Fequency) tones from the telephone sets, and provides feedback to the telephone sets for example by sending a dial-tone or a ringing tone to the telephone sets. By interpreting the key presses, the central processing equipment controls the interconnection of the telephone sets based on numbers dialed by the telephone sets.

Call park and call park pickup has been implemented using central call processing equipment. During a call, user at a terminal set provides a user input to park the call. The terminal set in turn instructs the central call processing equipment to park the call. The central equipment parks the call and provides the user with a park ID (IDentification) containing a slot number as a key to allow for the retrieval of the call. The user can then pickup the parked call from any other terminal set within the network by entering the park ID. The other terminal set then instructs the central call processing equipment to retrieve the call and the call is transferred to the other terminal set.

In both call park and call park pickup, it is the central call processing engine that provides the call park and call park pickup functionality. Such a call park and call park pickup system is not well suited for scalability and, as discussed above, when the capacity of the central call processing equipment is exceeded an upgrade is required. In addition, central call processing equipment adds additional costs to the total cost of the communication solution.

SUMMARY OF THE INVENTION

In a call park and call park pickup system, a plurality of network devices have local call park functionality. For call park of a call between two network devices initiated at one of the network devices and call park pickup of the call at a third network device, the local call park functionality is used to provide messaging between the network devices participating in the call park and call park pickup of the call. By having the call park functionality locally on the network devices any information that would otherwise be held at a central location can now be stored locally. Furthermore, by having the call park functionality locally on the network devices there is no requirement for centralized processing intelligence thus eliminating the need of central call processing equipment for providing call park and call park pickup functionality. As the requirement for central call processing equipment is removed, network devices can be added to a system without incurring high costs of replacing central processing equipment when a system becomes large.

BRIEF DESCRIPTION OF THE DRAWINGS

FIG. 5 is a routing table of a terminal set of FIG. 1;

DETAILED DESCRIPTION OF THE PREFERRED EMBODIMENTS

Embodiments of the invention provide a call park and call park pickup system. In call park and call park pickup systems, a call is established between a first network device and a second network device. A user at the second network device initiates a call park of the call by pressing a call park key for example. The second network device displays a park ID (IDentification) containing a reference to the first or second network device. The user then moves to a third network device; initiates call park pickup of the parked call; and enters the park ID to establish a media path with the first network device. In some embodiments of the invention, the network devices in the network provide call park and call park pickup functionality entirely locally at the network devices participating in the call. In some embodiments of the invention, this call park and call park pickup functionality can be implemented as part of a call processing capability that incorporates other call processing features. An example implementation of an embodiment of the invention will be described with reference to FIGS. 1 to 6 in the context of call processing on a peer-to-peer distributed network which incorporates call park and call park pickup of calls.

Figure 1:
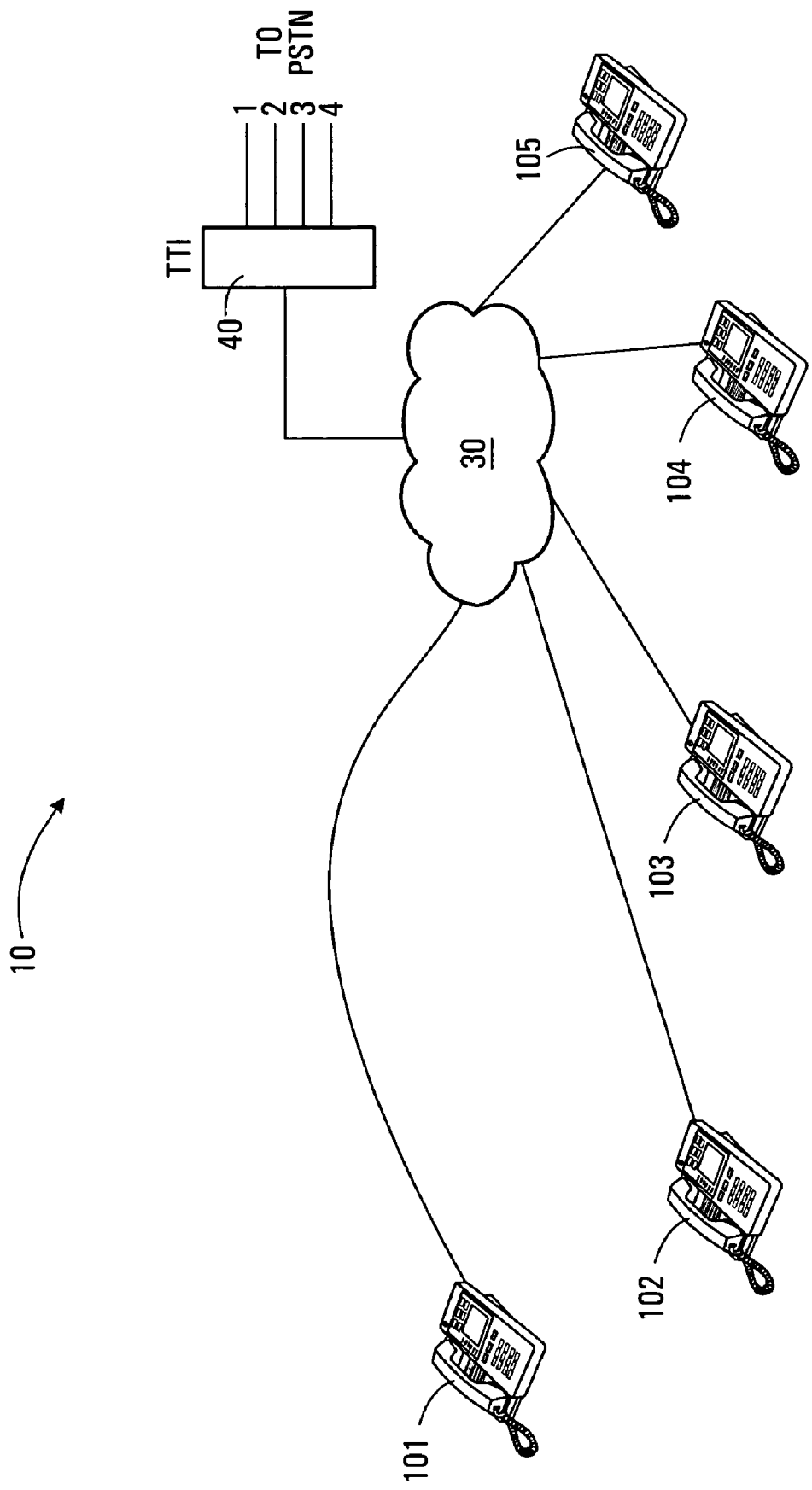
FIG. 1 is an example implementation of a system that makes use of network based distributed peer-to-peer call processing.

Referring to FIG. 1, shown is an example implementation of a system generally indicated by 10 which makes use of network based distributed peer-to-peer call processing. In addition to call park and call park pickup functionality, in the example, call processing functionality such as call forwarding, call transfer, voice mail, and paging, and other features such as time synchronization, backup features, and peer discovery, may be provided locally at network devices within a network. Such features and functionality are described in U.S. Provisional Patent Application No. 60/441,481 entitled "DISTRIBUTED PEER-TO-PEER CALL TRANSFER SYSTEM, METHOD AND TELEPHONE TERMINALS" and filed Jan. 22, 2003; U.S. Provisional Patent Application No. 60/441,121 entitled "DISTRIBUTED PEER-TO-PEER CALL FORWARDING SYSTEM, METHOD AND TELEPHONE TERMINAL" and filed Jan. 21, 2003; U.S. Provisional Patent Application No. 60/434,813 entitled "DISTRIBUTED PEER-TO-PEER VOICE MAIL SYSTEM, METHOD AND TELEPHONE TERMINALS" and filed Dec. 20, 2002; U.S. Provisional Patent Application No. 60/473,877 entitled "DISTRIBUTED PEER-TO-PEER CALL PARK AND CALL PARK PICKUP SYSTEM, METHOD AND TELEPHONE TERMINALS" filed May 29, 2003; U.S. Provisional Patent Application No. 60/518,646 entitled "PEER-TO-PEER DISCOVERY SYSTEM, METHOD AND NETWORK DEVICES" filed Nov. 12, 2003; U.S. Provisional Patent Application No. 60/523,703 entitled "PEER BACK-UP IN A DISTRIBUTED PEER-TO-PEER NETWORK: SYSTEM, METHOD AND NETWORK DEVICES" filed Nov. 21, 2003; U.S. Provisional Patent Application No. 60/523,140 entitled "TIME SYNCHRONIZATION OF NETWORK DEVICES IN A NETWORK: SYSTEM, METHOD AND NETWORK DEVICE" filed Nov. 19, 2003; U.S. Provisional Patent Application No. 60/524,041 entitled "SYSTEM, METHOD AND NETWORK DEVICES FOR PAGING IN A NETWORK" filed Nov. 24, 2003; U.S. Patent Application No. 60/434,813 entitled "VOICE MAIL SYSTEM, METHOD AND NETWORK DEVICES" filed Dec. 22, 2003 U.S. Patent Application entitled "CALL FORWARDING SYSTEMS, METHODS AND NETWORK DEVICES" Ser. No. 10/760,530 filed Jan. 21, 2004; and U.S. Patent Application entitled "CALL TRANSFER SYSTEM, METHOD AND NETWORK DEVICES" Ser. No. 10/762,754 filed Jan. 22, 2004, all of which are incorporated herein by reference. It is to be clearly understood that embodiments of the invention are also provided which only provide call park and call park pickup functionality.

The system 10 has a TTI (Thin Trunk Interface) 40 and five terminal sets 101, 102, 103, 104, 105 on a network 30. The network 30 may be for example a LAN (Local Area Network). In the example of FIG. 1 there are five terminal sets 101, 102, 103, 104, 105; however, more generally there are a total of N terminal sets where N≧2. Furthermore, in some implementations N can be a large number, for example in the thousands. The TTI 40 is, for example, a basic Analog or digital T1/E1 interface or any other suitable PSTN interface and provides a local central office or PSTN (Public Switched Telephone Network) interworking interface. The TTI 40 is coupled to a number of telephone "lines" 1, 2, 3, 4. Lines 1, 2, 3, 4 are wire pairs representative of facilities provided by a local central office or PSTN (not shown). In some implementations, there are many lines requiring multiple thin trunk interfaces. For example, in one implementation, 8 lines are required for connection to the PSTN and a second thin trunk interface is added to the system 10. It is to be understood that the system 10 of FIG. 1 is only a specific example of the incorporated subject matter. For example, in some implementations the network 30 form part of a larger network that is a collection of smaller networks interconnected by way of VPN (Virtual Private Network) connections for example.

In another example implementation there are two or more networks each having a TTI and at least one network device capable of providing call park and call park pickup functionality locally. An external call received from a network device on another network is routed through a respective TTI on the network on which the network device intended to receive the call resides. The network device receiving the external call provides local call park and call park pickup functionality for the external call if required.

Unlike conventional systems, the system 10 of FIG. 1 features distributed call processing, and a number of capabilities including distributed call park and call park pickup of calls.

Figure 2:
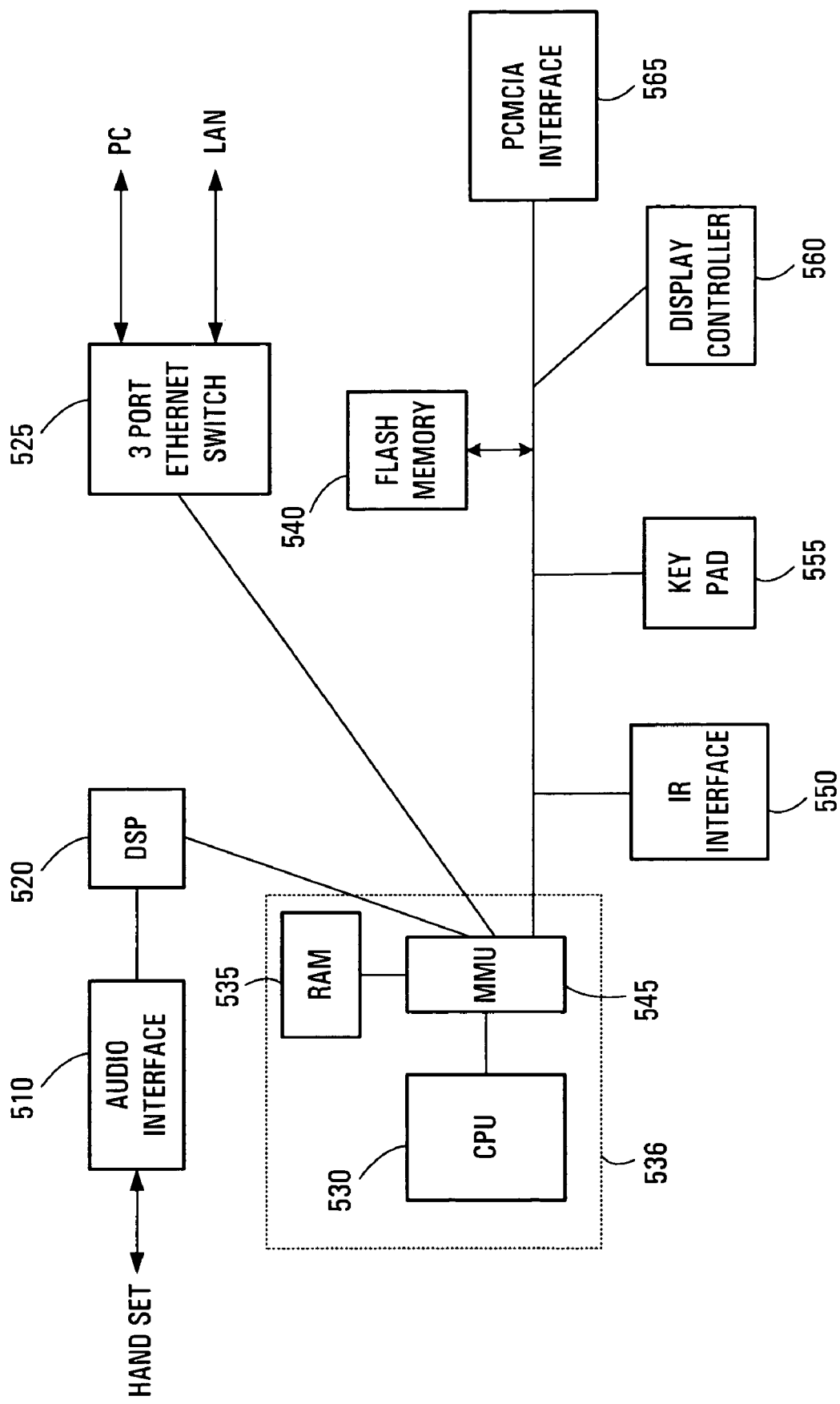
FIG. 2 is a partial circuit block diagram of a terminal set of the system of FIG. 1.

Referring to FIG. 2, shown is a partial circuit block diagram of terminal set 101 of FIG. 1. Terminal sets 102, 103, 104, 105 are similar to terminal set 101 and have a circuit that can be equally represented by the partial circuit block diagram of FIG. 2. A CPU (Central Processor Unit) 530, a MMU (Memory Management Unit) 545 and a RAM (Random Access Memory) 535 form a processing device 536. The processing device 536 is connected to a Digital Signal Processing (DSP) 520 for encoding and decoding audio signals. The DSP 520 is connected to an audio interface 510. The processing device 536 is also connected to a 3-port switch 525 to allow connection to the LAN 30 and/or a PC (Personal Computer). The processing device 536 is also connected to a non-volatile flash memory 540, an IR (Infra-Red) interface 550, a Keypad and button interface 555, an LCD (Liquid Crystal Display) controller 560, and a PCMCIA (Personal Computer Memory Card International Association) Interface 565 to allow for standardized expansion of the terminal set 101. While a specific architecture is shown in FIG. 2, it is to be understood that the invention is not limited to the architecture shown in FIG. 2. More generally, in some implementations, a portion of or all of the functionality provided by the partial circuit block diagram of FIG. 2 is implemented on any network device, such as a terminal set, the TTI 40, and a PC (Personal Computer) for example. Preferably, the network device is a packet based telephone such as an VoIP (Voice over Internet Protocol) telephone terminal set. Other examples are video phone, a PDA (Personal Digital Assistant), a soft phone, a wireless device, or a wireless telephone that can be suitably programmed and configured to provide the distributed call forwarding functionality described below. In some cases, the terminal sets are for example IP phones such as that manufactured by Mitel, Nortel, Avaya, Siemens, NEC, Pingtel or 3COM.

Figure 3:
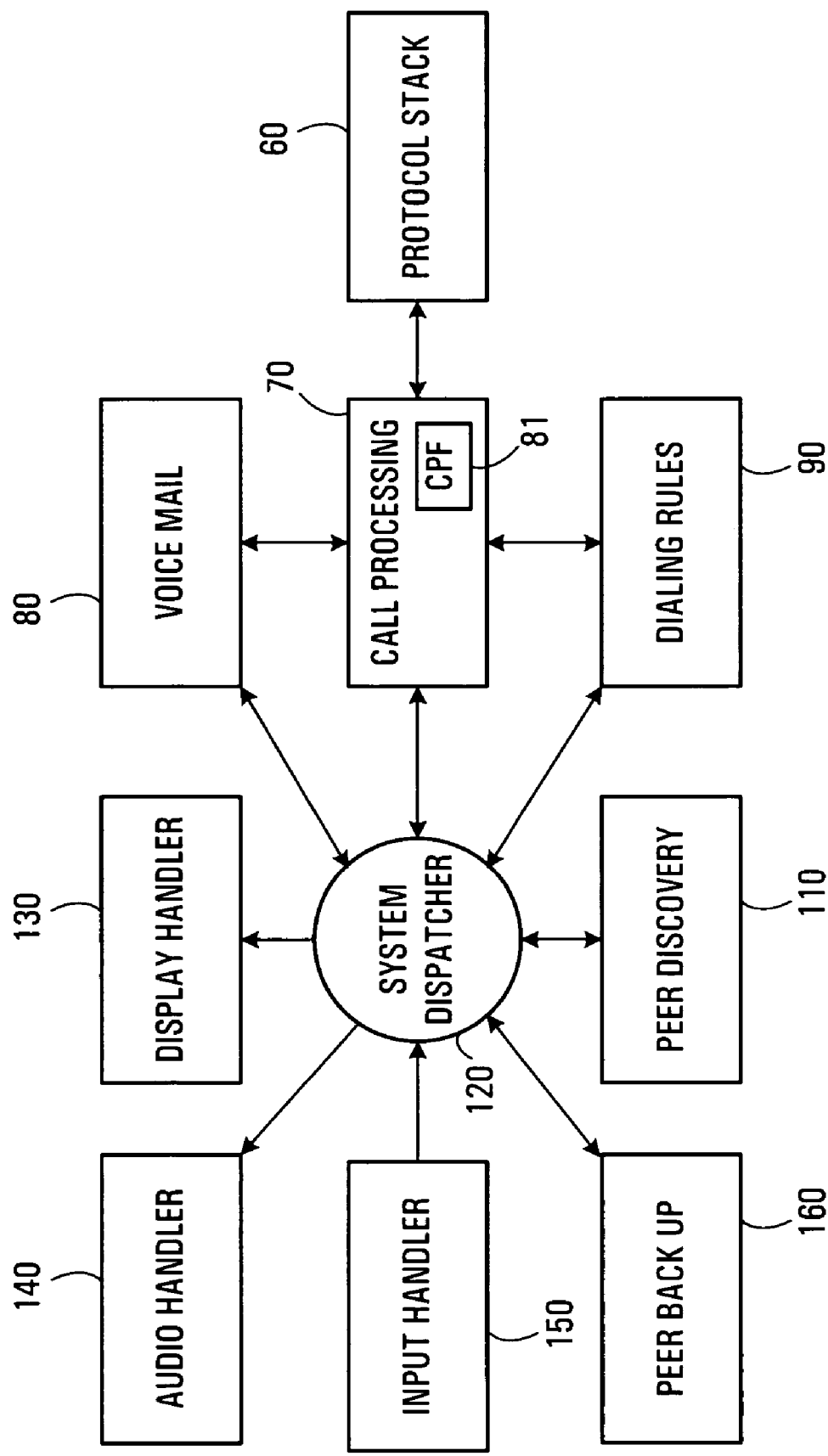
FIG. 3 is a functional block diagram of software operating on a terminal set of FIG. 1.

Referring to FIG. 3, shown is a functional block diagram of software operating on terminal set 101 of FIG. 1. The software will be described as operating on terminal set 101; however, it is to be understood that similar software is implemented in terminal sets 102, 103, 104, 105. Furthermore, in some cases, at least some of the features of the software described below are implemented in any network device such as the TTI 40 for example. The software is stored in RAM 535 of FIG. 2 and runs on the CPU 530. More generally, the software can be implemented as any suitable combination of instructions stored in memory for execution by general or special purpose processors, firmware, ASICs (Application Specific Integrated Circuits), FPGAs (Field-Programmable Gate Arrays), and general or special purpose logic. A system dispatcher 120 provides communication and scheduling between various functional elements which include a call processing module 70, a voice mail module 80, a dialing rules module 90, a peer discovery module 110, a display handler 130, an audio handler 140, an input handler 150, and a peer back-up module 160. The call processing module 70 also interfaces with a protocol stack 60. The call processing module has a CPF (Call Park Function) for handling call park and call park pickup of calls.

FIG. 3 shows a detailed example of functions that may be included in a network device; however, it is to be understood that a network device need not have all of the functions shown in FIG. 3 and that in some implementations a network device will have only some of the functionality shown in FIG. 3. The display handler 130 formats information and displays the information to a user. The input handler 150 monitors inputs from for example key presses, hook switch, volume keys, and hands free and mute buttons and informs the system dispatcher 120. The system dispatcher 120 then distributes messages to other modules for further appropriate action to be taken. The audio handler 140 plays audio tones such as ringing, busy, and call waiting tones and/or connects to a handset speaker or speaker phone through a media call upon receipt of an audio message from the system dispatcher 120.

When terminal set 101 is initially connected to the network 30 it performs a peer discovery by executing the peer discovery module 110. At this point terminal set 101 undergoes a discovery of peer network devices such as terminal sets 102, 103, 104, 105 and TTI 40 by way of messages between terminal set 101 and terminal sets 102, 103, 104, 105 and TTI 40. Once the peer terminal sets are discovered, information is exchanged between the terminal set 101 and the peer network devices. At least part of the information exchanged in the messages is included in a routing table illustrated by way of example as shown in FIG. 5. The routing table is generally indicated by 200 and contains routing information for each of terminal sets 101, 102, 103, 104, 105 and TTI 40. A column 210 contains a DN (Directory Numbers) for each terminal 101, 102, 103, 104, 105. For example, in one case terminal sets 101, 102, 103, 104, 105 have DNs 201, 202, 203, 204, 205 respectively. The DN uniquely identifies terminal sets 101, 102, 103, 104, 105 within the network 30. In the example implementation the TTI 40 is not a user dialable device. TTI 40 is given a different identifier T01 so that it can nonetheless be identified by other network devices. A column 220 has as entries a MAC (Media Access Control) address for each terminal set 101, 102, 103, 104, 105 and TTI 40. A column 230 has as entries an IP (Internet Protocol) address assigned to each terminal set 101, 102, 103, 104, 105 and TTI 40. A column 240 indicates a current device status of each terminal set 101, 102, 103, 104, 105 and TTI 40. For example, in one implementation a "1" indicates that a network device is up and running whereas a "0" indicates that the network device is un-available due to, for example, a failure.

In some implementations, a network device has one or more network devices designated to serve as backup network devices in the event the network device is unavailable to process a call. In particular, if a network device is unavailable to process a call, the call is re-directed to one of its designated backup network devices and the designated backup network device receiving the re-directed call provides call functionality for the network device that is unavailable. In the example of FIGS. 1 to 3, and 5 for each terminal set 101, 102, 103, 104, 105 there are two network devices designated as backup network devices which are identified in columns 260, 270 of the routing table 200. For example, network devices having DNs 202, 205 in columns 260, 270, respectively, are designated as backup network devices for terminal set 101 which has DN 201. In the example implementation, the TTI 40 (T01) is not backed up; however, as further discussed below in some implementations the TTI 40 is backed up by one or more network devices. As shown in the routing table 200, there are preferably two backup network devices designated for each network device; however, more generally, there is one or more backup network devices designated for each network device. In our example implementation, in columns 260, 270 the backup network devices are identified by their DNs for clarity. Some implementations make use of DNs to identify backup network devices as illustrated. In other embodiments of the invention, MAC addresses are maintained in columns 260, 270 to identify the backup network devices. Furthermore, any unique identifier for the network devices may be used. The routing table 200 is shown as an illustrative example of the type of routing information that might be maintained; however, the invention is not limited to the illustrative example of FIG. 5 and in other implementations fewer or additional routing information is maintained in the routing table 200. More generally, the routing table 200 may contain any information on network devices, which is maintained for providing local functionality such as voice mail, call transfer, call forward, paging, backup, and call park and call park pickup functionality. Other information that may also be maintained in table 200 might be for example, network device type identifiers, timestamps for synchronization purposes, network class identifiers for identifying a network class on which a network device is connected, and activity indicators identifying whether network devices are active. For purposes of providing backup functionality entries in columns 260, 270 are maintained. On a more simplified level, each network device maintains an identification of its designated backup network devices and an address for each designated backup network device. In particular, when a new network device is added to the network 30, the network device makes use of its peer discovery module 110 to obtain routing information pertaining to other network devices in the network 30 and makes use of the peer backup module 160 to designate two other network devices as backup network devices. In some implementations, maintaining column 260, 270 involves periodically redistributing backup designations to prevent, for example, a network device form continuously providing backup functionality for another network device that is prone to failure. Periodic redistribution of backup designations provides a fair distribution of workload in providing voice mail backup functionality among the network devices.

Referring back to FIG. 3, the dialing rules module 90 contains and/or applies a set of dialing rules for the call-processing module 70, which control how calls are directed. As an example of a dialing rule, a dialing rule might allow a terminal set to apply one or a set of filters to numbers dialed and if a match is found then the call is routed via a specific route to its destination.

The call-processing module 70 interacts with the protocol stack 60 to set up and tear down calls, and to set up media calls. When a call is received and a user is unable to answer the call because he or she is taking another call or because he or she is away from the terminal set, then the call may be optionally handled by the voice mail module 80.

The call processing modules of a number of network devices collectively serve to deliver PBX-like (Private Branch Exchange-like) call processing capabilities in a distributed fashion without the need for a PBX (Private Branch Exchange). For example, the call processing module 70 of terminal set 101 handles calls not only intended for terminal set 101 but also handles calls for other network devices for which it has been designated as a backup terminal set. This allows the voice mail module 80 to handle calls for the other network devices for which terminal set 101 has been designated as a backup terminal set. With reference to columns 210, 260 of the routing table 200, the network devices having DNs 202 and 205 both have designated as a backup network device the network device having DN 201. As such, the network device having DN 201 provides voice mail functionality for calls not only intended for itself but also for calls intended for the network devices having DNs 202, 205. In particular, when the network device having DN 202 is unavailable, the network device having DN 201 will serve as a backup network device to provide call processing and/or voice mail functionality for calls intended for the network device having DN 202. Similarly, when network device having DN 205 is unavailable, the network device having DN 201 will serve as a backup network device to provide call processing and/or voice mail functionality for calls intended for the network device having DN 205.

Figure 4:
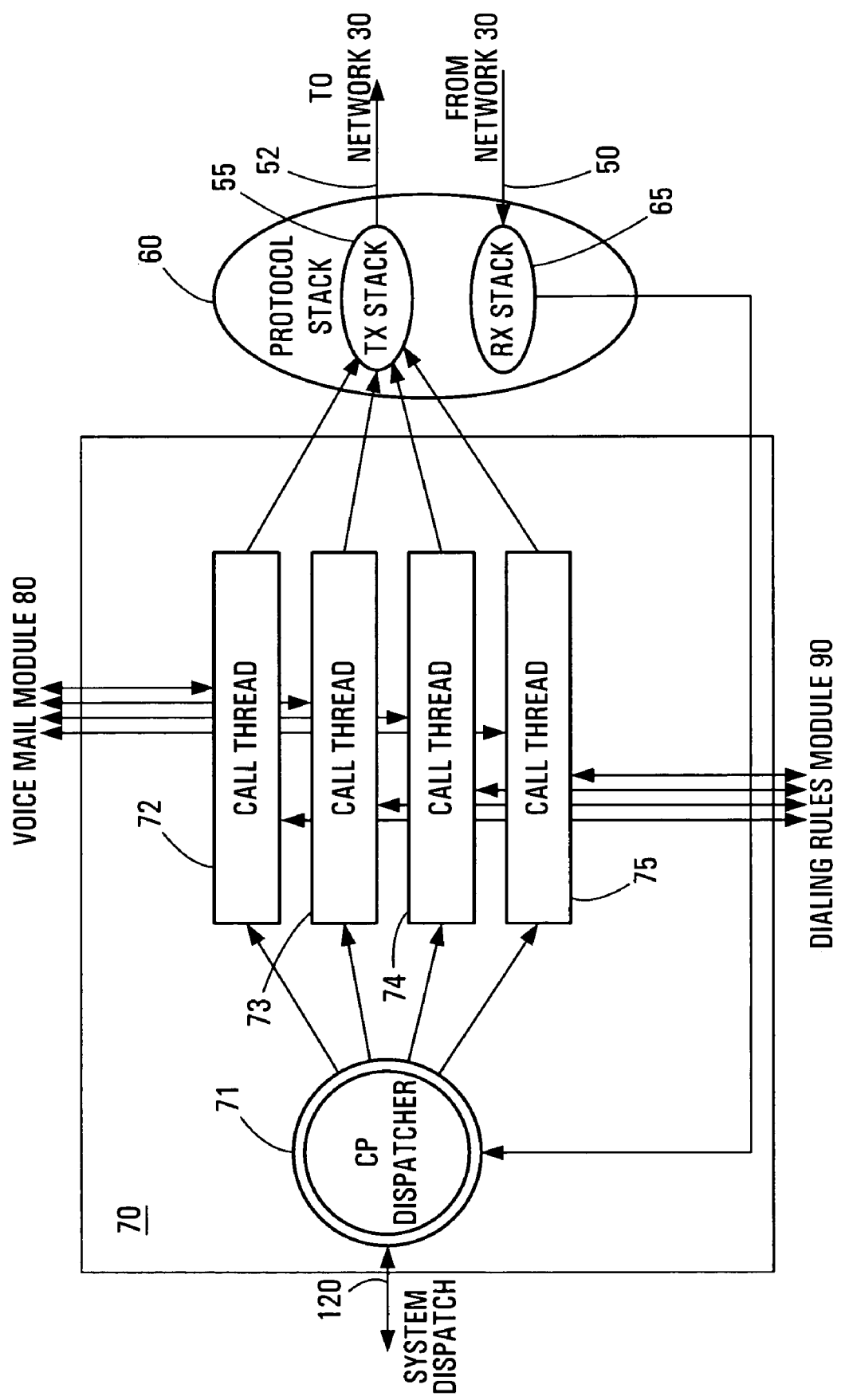
FIG. 4 is a functional block diagram of a call processing module of the software of FIG. 3.

An example implementation of the call processing module 70 together with the protocol stack 60 is shown in FIG. 4. In FIG. 4, the call processing module 70 has four call threads 72, 73, 74, 75 and a CP (Call Processor) dispatcher 71. The protocol stack 60 has a Tx (Transmit) stack 55 and an Rx (Receive) stack 65. Incoming calls are queued in the Rx stack 65 and outgoing calls are queued in the Tx stack 55. A channel 50 provides a connection to the network 30 for the incoming calls and a channel 52 provides a connection to the network 30 for the outgoing calls. The incoming and outgoing calls may be for example in the form of messages that are for example requests, responses to request, messages containing information such as routing information for other network devices, messages containing information such as routing information from other network devices, and messages containing media information. The requests may be for example, requests for establishing connections, requests for terminating connections, or media data such as voice.

Each of the call threads 72, 73, 74, 75 is capable of handling a respective call. For example, a media call received by the terminal set 101 may be processed by the call thread 72, while a voice mail message may be recorded simultaneously on call thread 73. In addition, the call thread 74 might at the same time be involved in recording a voice mail message intended for another network device for which terminal set 101 is designated as a backup. The CP dispatcher 71 manages the call threads 72, 73, 74, 75 and performs scheduling of incoming and outgoing calls. In addition, the four call threads 72, 73, 74, 75 provide a mechanism for simultaneously handling 3-way conferencing plus voice mail. The invention is not limited to four call threads and in other implementations, there are two or more call threads. In some implementations in which there are two call threads, the two call threads might be used to simultaneously handle an incoming call and another call intended for voice mail, paging, call park and call park pickup, or call forwarding for example.

When an incoming message for a call arrives at the protocol stack 60 through channel 50, the incoming message is queued in the Rx stack 65 and then sent to the CP Dispatcher 71. The CP dispatcher 71 determines the thread 72, 73, 74, 75 to which the call is to be sent and forwards the message to the determined thread. Each call thread 72, 73, 74, 75 is capable of interfacing with the voice mail module 80, the dialing rules module 90, the peer discovery module 110, the display handler 130, the audio handler 140, the input handler 150, and the peer backup module 160. The call threads 72, 73, 74, 75 are shown interfacing with the voice mail module 80, the dialing rules module 90, and the CP dispatcher 71 only for purposes of clarity. The module or modules that a call thread interfaces with depends on the type of message being received or made. For example, if the message is intended for voice mail, the voice mail module 80 interfaces with the call thread. In response to the received message one of the call threads 72, 73, 74, 75 interfacing with one or more of the modules if necessary and generates a response message to the Tx stack 55 of the protocol stack 60 to be packaged and sent to a destination network device. The message contains information provided by one or more of the modules 80, 90, 110, 130, 140, 150, 160. The type of message being sent back to the network 30 depends on the state of the call thread. If, for example, the call received corresponds to an INVITE message for initiating a new call under a SIP (Session Initiation Protocol) then the response is an appropriate acknowledgement such as a RINGING message indicating that the terminal set is ringing or an OK message indicating that the call has been answered.

Figure 6:
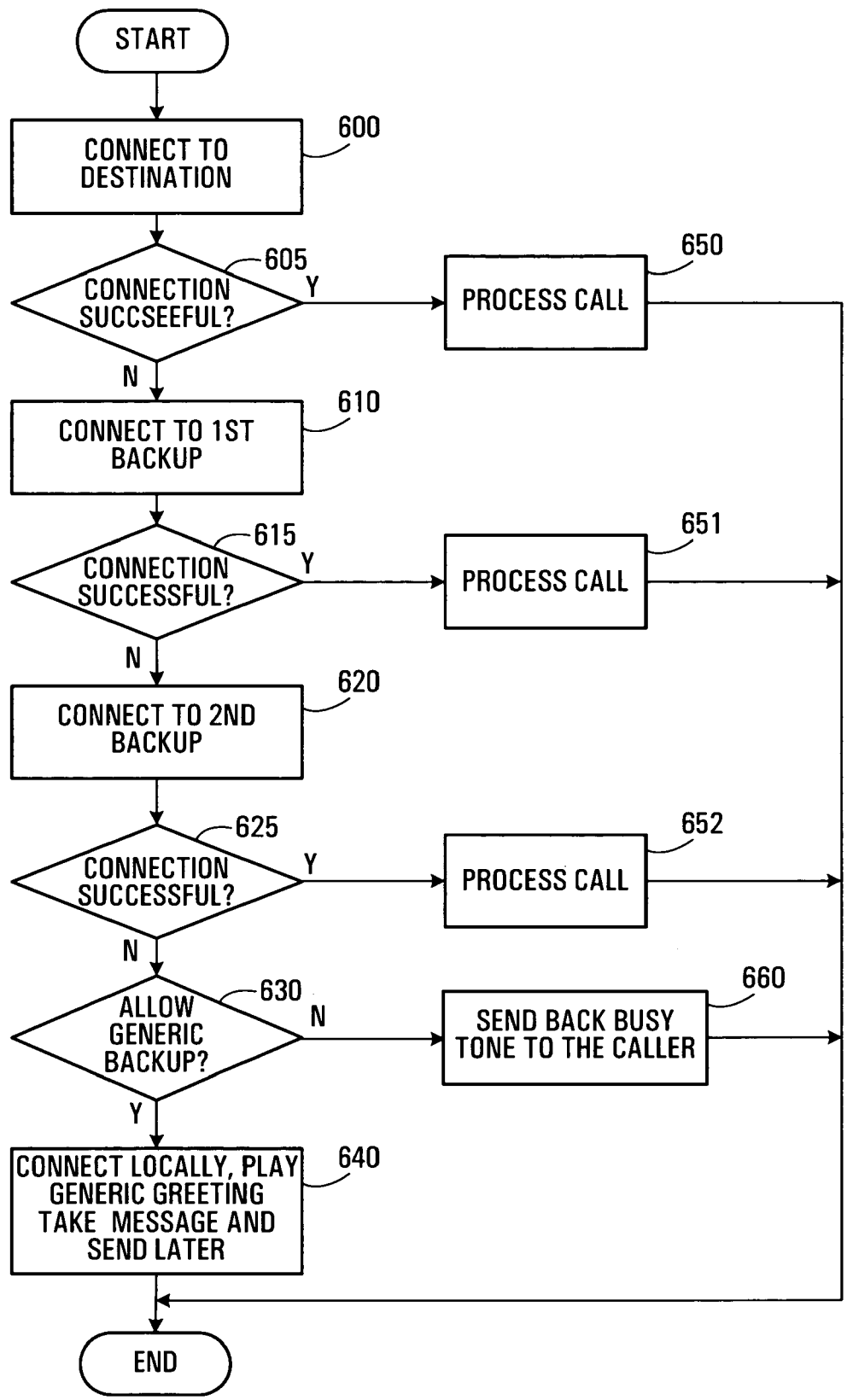
FIG. 6 is a flow chart of a method of initiating a call from one network device to another network device which might for example be employed in the system of FIG. 1.

Referring to FIG. 6, shown is a flow chart of a method of initiating a call from one network device to another network device which might for example be employed in the system 10 of FIG. 1. In particular, a caller at an originator network device wishes to call a person at a destination network device. At step 600, the originator network device attempts to establish a connection for a call with the destination network device. At step 605, if the connection is established the call is processed (step 650). The attempt may be unsuccessful due to for example one or more of a network failure, failure at the destination network device, the destination network device being unplugged and lack of resources at the destination network device to process a call. In some cases, the lack of resources might be due to for example all call threads at the destination network device being used simultaneously. At step 605 if the attempt is unsuccessful, then the originator network device looks up its routing information to determine which network device is to serve as a first backup network device for the destination network device and to determine an address for the first backup network device. The originator network device then initiates a call to the first backup network device by attempting to establish a connection using the address of the first backup network device (step 610). At step 615, if the attempt is successful and a connection is established with the first backup network device, the call is processed (step 651). Again, the attempt at the connection with the first backup network device may be unsuccessful and at step 615, if the attempt of step 610 fails, then the originator network device looks up its routing information to determine which network device is to serve as a second backup network device for the destination network device and to determine an address for the second backup network device. The originator network device then initiates a call to the second backup network device by attempting to establish a connection using the address of the second backup network device (step 620). At step 625, if the attempt is successful and a connection is established with the second backup network device, the call is processed (step 652). The originator network device has a generic call processing capability that allows the originator network device to take the call locally and provide voice mail functionality locally using a generic greeting. In particular, there is a user option for enabling the generic call processing capability. At step 625, if the attempt of step 620 is unsuccessful, a determination of whether the generic call processing capability is enabled is determined (step 630). At step 630, if the generic call processing capability is enabled a connection is established locally, a generic voice mail greeting is played and a voice mail message from the caller initiating the call is recorded and later sent to the destination network device when the destination network device becomes available (step 640). At step 630, if the generic voice mail functionality is disabled a busy tone is played to the caller (step 660).

In the example of FIG. 6, it is assumed that for steps 600, 610, 620 the destination network device, the first backup network device, and the second backup network device, respectively, are available before a connection is attempted; however, in some implementations at the steps 600, 610, 620 a look-up in column 240 of the routing table 200 is performed to first determine whether a network device for which a connection is to be established is active. An attempt at a connection is then performed only if the network device is active.

Regarding processing at the destination network device, in one implementation at step 650 the call is processed with a ringing signal being generated for answering of the call by a user at the destination network device and only after a predetermined number of ring is a voice mail message taken. However, at steps 651, 652, 640, the call is directly processed by a call processing thread in cooperation with the voice mail module of the network device answering the call, whether it be a designated backup network device (step 651 or 652) or the originator network device (step 640).

Whether it be the destination network device (step 650), or one of the designated backup network devices (step 651 or 652), or the originator network device (step 640), the network device that accepts the call preferably does so in a manner that is unique to the original destination telephone set. This might for example involve having each network device maintain its own specific voice mail greeting and other greetings specific to the network devices the designated as backup network devices. Furthermore, in some implementations, each network device maintains user options for handling voice mail and call forwarding.

In the method of FIG. 6, each network device is assigned two other network devices as backup network devices and as such there are up to two attempts at establishing connections with network devices designated as backup network devices (steps 610, 620). More generally, a network device has M other network devices designated as backup network devices with $M \geq 1$ and successive attempts at establishing connections with the M backup network devices are performed until one of the attempts is successful. Again, in some implementations the status of a network device is first looked-up and an attempt at a connection with the network device is performed only if the status indicates that the network device is active. As such in some cases, there are $0 \leq N \leq M$ attempts at establishing connections with backup network devices. If none of the attempts are successful then the call is handled locally as described with reference to steps 630, 640, 660. Furthermore, in some implementations, there is no generic call processing capability as described with reference to step 640 in which case when the attempt at step 625 is unsuccessful, the caller is provided with a busy tone (step 660).

In the example implementation of FIGS. 1 to 6, the TTI 40 is not backed up by another network device; however, in some implementation the TTI 40 is backed up by one or more other network devices. In some embodiments of the invention each network device is backed up by one or more network devices. Preferably, for each network device one or more network devices of the same type are designated as backup network devices. For example, in some embodiments of the invention a telephone terminal set has one or more other telephone terminal sets designated as backups and a TTI has one or more other TTIs designated as backups.

The method of FIG. 6 will now be described for a specific example in which a user at terminal set 101 of FIG. 1 attempts to make a call to terminal set 103. In this specific example terminal sets 101 and 103 correspond to the originator and destination network devices, respectively. In the specific example terminal sets 101, 102, 103, 104, 105 have DNs 201, 202, 203, 204, 205, respectively. As shown in columns 210, 260, 270 of the routing table 200, the network devices having DNs 202, 204 (terminal sets 102 and 104) are designated as backup network devices for the network device having DN 203 (the destination network device corresponding to terminal set 103). At step 600 terminal set 101 attempts to establish a connection for a call with terminal set 103. At step 605, if the connection is established the call is processed by terminal set 103 (step 650). At step 605 if the attempt is unsuccessful, then the terminal set 101 looks up its routing table 200 to determine from column 260 that terminal set 102 (DN 202) is to serve as a first backup terminal set for terminal 103 (DN 203) and determines from column 220 or 230 an address for terminal set 102. In some implementations, the call processing module 70 is responsible for retrieving the address of the first backup network device and for providing instructions for connecting to the first backup network device. The terminal set 101 then initiates a call to the terminal set 102 by attempting to establish a connection using the address of terminal set 102 (step 610). At step 615, if the attempt of step 610 is successful and a connection is established with terminal set 102, the call is processed by terminal set 102 (step 651). At step 615, if the attempt of step 610 fails, then terminal set 101 looks up its routing table 200 to determine from column 270 that terminal set 104 (DN 204) is to serve as a second backup terminal set for terminal set 103 (DN 203) and to determine from column 220 or 230 an address for the terminal set 104. The terminal set 101 then initiates a call to terminal set 104 by attempting to establish a connection using the address of terminal set 104 (step 620). At step 625, if the attempt is successful and a connection is established with terminal set 104, the call is processed by terminal set 104 (step 652). At step 625, if the attempt of step 620 is unsuccessful, a determination of whether the generic call processing capability is enabled is determined (step 630). At step 630, if the generic call processing capability is enabled a connection is established locally, a generic voice mail greeting is played and a voice mail message from the caller initiating the call at terminal set 101 is recorded and later sent to terminal set 103 when terminal set 103 becomes available (step 640). At step 630, if the generic voice mail functionality is disabled a error tone such as a fast busy is played to the caller at terminal set 101 (step 660).

The method of FIG. 6 describes how a network device attempts to establish a call and in some cases the call is answered by way of voice mail. The manner in which a network device participates in call park and call park pickup of a call using distributed call processing functionality will now be described.

Call Park and Call Park Pickup

By way of background, call park and call park pickup has been implemented using central call processing equipment. During a call, user at a terminal set provides a user input to park the call. The terminal set in turn instructs the central call processing equipment to park the call. The central equipment parks the call and sends a park ID (IDentification) to the user's terminal set for presentation to the user. The park ID contains a slot number and a key to allow for the retrieval of the call. The user can then pickup the parked call from any other terminal set within the network by entering the park ID. The other terminal set then instructs the central call processing equipment to retrieve the call and the call is transferred to the other terminal set.

With reference to FIGS. 7A, 7B, and 8A to 8F a detailed description of various embodiments of the invention will now be given in which network devices are provided with local call park and call park pickup functionality in a system where there is no need for central call processing equipment for providing call park and call park pickup functionality.

Figure 7A:
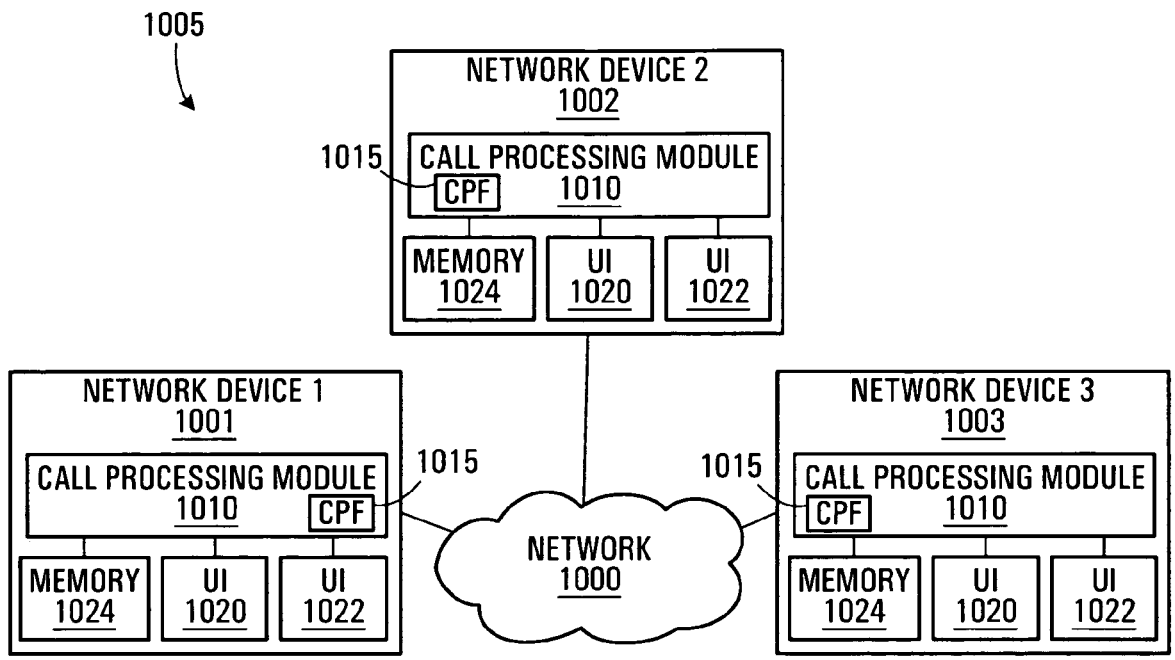
FIG. 7A is a basic block diagram of a distributed peer-to-peer network.

Referring to FIG. 7A, shown is a basic block diagram of a distributed peer-to-peer network. In FIG. 7A shown are first, second, and third network devices 1001, 1002, 1003, respectively, on a network 1000 of a system 1005. Each network device 1001, 1002, 1003 has a UI (User Interface) 1020, a UI 1022, a memory 1024, and a call processing module 1010 having a CPF (Call Park Function) 1015.

The call processing module 1010 of the network devices 1001, 1002, 1003 is adapted to process calls using the CPF 1015 to provide local call park and call park pickup functionality.

In some embodiments of the invention, the call processing functionality of the call processing module 70 described above with reference to FIGS. 1 to 6 is implemented in the call processing modules 1010; however, it is to be clearly understood that in other embodiments only some of the call processing features described above are implemented and other call processing features may also be implemented.

In FIG. 7A, the CPF 1015 is implemented as part of the call processing module 1010; however, the invention is not limited to the CPF 1015 being implemented as part of the call processing module 1010 and in some embodiments of the invention the CPF 1015 is distinct from the call processing module 1010. In the description that follows, it is assumed that the CPF 1015 is implemented as part of the call processing module 1010. Furthermore, the CPF 1015 is implemented in any suitable way including software, hardware, or firmware for example.

Each network device may be for example a terminal set, a packet based telephone, a VoIP (Voice over Internet Protocol) telephone, a video phone, a PC (Personal Computer), a PDA (Personal Digital Assistant), a soft phone, a wireless device, or a wireless telephone suitably programmed and configured to provide call park and call park pickup functionality. In some embodiments of the invention a network device may be programmed and configured to provide only one of the call park and call park pickup functionalities.

In a call park and call park pickup of a call between two network devices, call park of the call is initiated at one of two of the network devices 1001, 1002, 1003 and the call is picked up at a third network device of the network devices 1001, 1002, 1003. In FIG. 7A, for each network device 1001, 1002, 1003 the call processing module 1010 provides call park and call park pickup functionality as one or more of the three network devices participating in the call park and call park pickup of the call using the CPF 1015. As an initiator of call park of a call, the UI 1020 of a network device is adapted to receive a user input from a user requesting a call park of the call and the CPF 1015 interfaces with the UI 1020 to receive instructions to park the call. The UI 1022 is used to present information to the user for use by the user in picking up the call at another network device. The user moves to the other network device and initiates call park pickup of the call by way of a user input using UI 1020 at the other network device.

A description of the messaging that occurs during a call park a call park pick up of a call will now be described below with reference to FIGS. 8A to 8F for various embodiments of the invention. As an illustrative example, in FIGS. 8A to 8F there is a call between networks devices 1001, 1002. A user at the second network device 1002 initiates call park of the call, moves to the third network device 1003 and initiates call park pickup of the call at the third network device 1003. However, it is to be understood that there are other possible scenarios. More generally, there might be a call between any two of network devices and call park pickup is initiated at one of the two network devices. Call park pickup of the call is then initiated at a third network device.

Figure 8A:
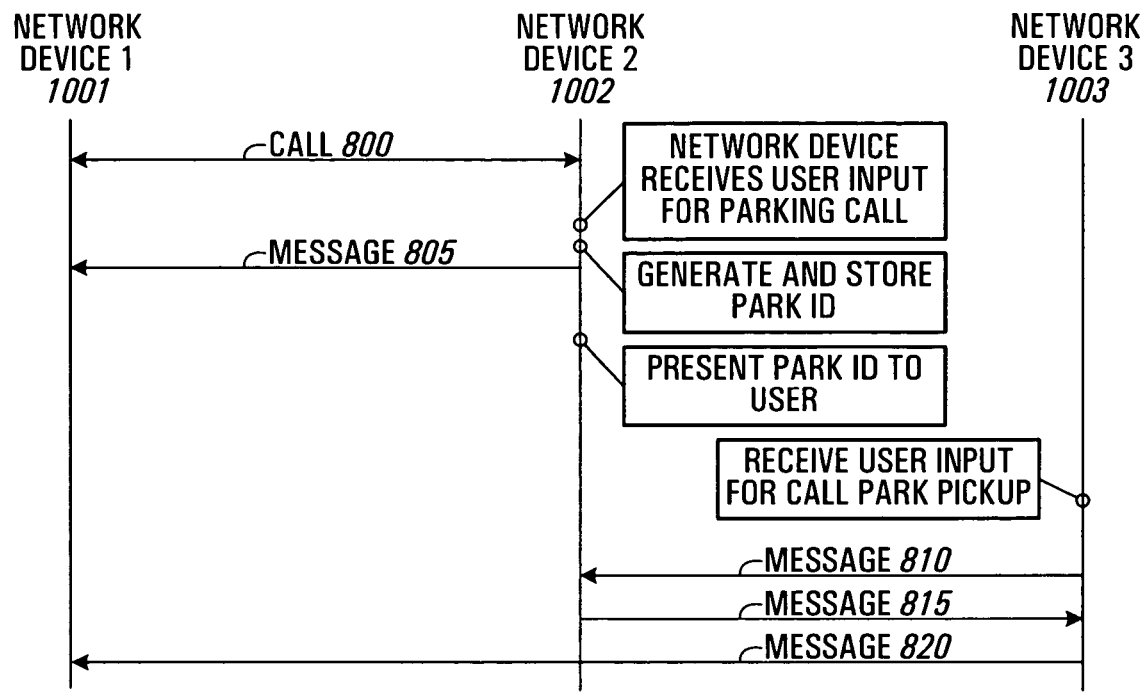
FIG. 8A is a signal flow diagram of the basic steps which take place in a call park and call park pickup scenario, according to an embodiment of the invention.

With reference to FIGS. 7A and 8A, there is a call 800 between the first network device 1001 and the second network device 1002. Responsive to a user input for parking the call 800, the second network device 1002 sends a message 805 to the first network device 1001 indicating that the call 800 is to be parked. Responsive to receiving the message 805, the first network device parks the call 800. The call has an identifier associated with it. The identifier uniquely identifies the call in the network 1000. This identifier might be generated for example when the call 800 is established. The second network device 1002 also generates and stores in memory 1024 a park ID (IDentification) containing a reference to the second network device 1002 and a reference to the parked call. The park ID is then presented to the user by way of user interface 1022. The reference to the second network device 1002 is any suitable identifier of the second network device 1002 such as a DN (Directory Number) of the second network device 1002 for example. The reference to the parked call is any suitable identifier of the call allowing the second network device 1002 to identify the call. In some implementations the identifier associated with the call 800 is represented by a large number of characters cannot be easily remembered by a user. However, the reference to the call 800 generated by the second network device 1002 is preferably represented by fewer characters and can be easily remembered by a user. In some embodiments of the invention, the reference to the call is a password for allowing access to the call 800. Preferably, the park ID contains a DN as the reference to the second network device 1002 and a reference to the call allowing the park ID to be displayed using few characters. For example, in one implementation the DN is a three digit number and the reference to the call is a single digit number allowing the user to easily remember the park ID; however, it is to be clearly understood that the invention is not limited by the number of characters used for the reference to the call and the reference to the second network device 1002. More generally, the reference to the call and the reference to the second network device 1002 are each represented by one or more characters.

The user moves to the third network device 1003 and initiates call park pickup of the call 800 at the third network device 1003 by entering the park ID. The network device 1003 sends a message 810 to the second network device 1002 containing the reference to the call 800. The second network device 1002 identifies the call 800 using the park ID stored and replies with a message 815 containing a reference to the first network device 1001 and the identifier of the call 800. The third network device 1003 then sends a message 820 containing the identifier to the first network device 1001 for establishing a media path with the first network device 1001.

In some embodiments of the invention, there is no message 805 being sent to the first network device 1001 and the second network device 1002 ignores media data associated with the call 800 that might be received from the first network device 1001 while the call 800 is parked.

In some implementations the park ID contains only the reference to the call. In such implementations, the user at the second network device 1002 is presented with the reference to the call 800. The user then picks up the call at the third network device 1003 by initiating call park pickup of the call 800 by entering the reference to the call 800 and a reference to the second network device 1002 known by the user. This reference to the second network device 1002 might be a DN or an IP address for example.

In some implementations, the message 815 contains information on the first network device 1001 that is used by the third network device 1003 in establishing a media path with the first network device 1001 when the call 800 is picked up. The information might include for example, a port and IP address of the first network device 1001 indicating to the third network device 1003 which port and IP address of the first network 1001 to use. Alternatively, a default port address can be used.

In some implementations, the message 820 contains information on the third network device 1003 for use by the first network device 1001 in establishing a media path with the third network device 1003. The information might include for example, a port and IP address of the third network device 1003 indicating to the first network device 1001 which port and IP address to use. Alternatively, a default port address may be used.

Figure 8B:
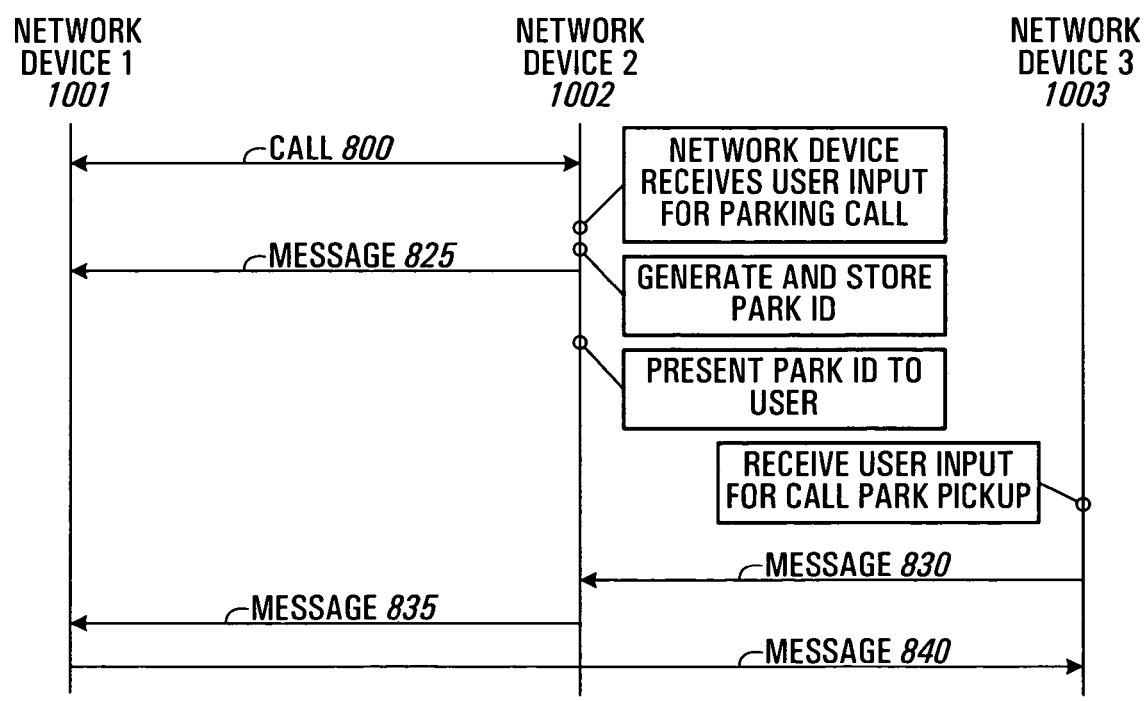
FIG. 8B is a signal flow diagram of the basic steps which take place in a call park and call park pickup scenario, according to another embodiment of the invention.

Referring to FIG. 8B, shown is a signal flow diagram of the basic steps which take place in a call park and call park pickup scenario, according to another embodiment of the invention. In FIG. 8B, there is the call 800 between the first network device 1001 and the second network device 1002. Responsive to a user input at the second network device 1002 initiating call park of the call 800, the second network device 1002 generates a park ID containing a reference to the second network device 1002 and a reference to the parked call, and stores the park ID in memory 1024. In some implementations, the park ID contains the reference to the call 800 only. The reference to the second network device 1002 is any suitable identifier of the second network device 1002 such as a DN of the second network device 1002 for example. The reference to the parked call is any suitable identifier of the call 800 allowing the second network device 1002 to identify the call 800. In some embodiments of the invention, the reference to the parked call is a password for allowing access to the call 800. Preferably, the park ID contains a DN as the reference to the second network device 1002 and a reference to the parked call allowing the park ID to be displayed using few characters.

The second network device 1002 also sends a message 825 to the first network device 1001 indicating that the call 800 is to be parked. Responsive to receiving message 825, the first network device 1001 parks the call 800. In some implementations, the message 825 contains the identifier of the call 800. Furthermore, in some implementations there is no message 825 being sent.

After generating the park ID, the second network device 1002 presents the park ID to the user by way of user interface 1022.

The user moves to the third network device 1003 and initiates call park pickup of the call 800 at the third network device 1003 by entering the Park ID by way of user interface 1020. The third network device 1003 sends a message 830 to the second network device 1002 containing the reference to the parked call 800 which is entered as part of the park ID. The second network device 1002 identifies the call 800 using the park ID stored and then sends to the first network device 1001 a message 835 containing a reference to the third network device 1003. The first network device 1001 then sends a message 840 to the third network device 1003 for establishing a media path with the third network device 1003.

In some implementations, the message 835 also contains the identifier of the call 800. For network devices capable of handling more than one call simultaneously the identifier of the call 800 allows the call 800 to be identified from other calls being handled. Furthermore, in some implementations messages 830 and 835 contain information on the third network device 1003 for use by the first network device 1001 in establishing a media path with the third network device 1003. The information contained in messages 830 and 835 might include for example a port address for a channel of the third network device 1003. Alternatively, a default port address can be used.

In some implementations the message 840 contains information on the first network device 1001 for use by the third network device 1003 in establishing the media path with the first network device 1001. The information contained in message 840 might include for example a port address for a channel of the first network device 1001. Alternatively, a default port address can be used.

Figure 8C:
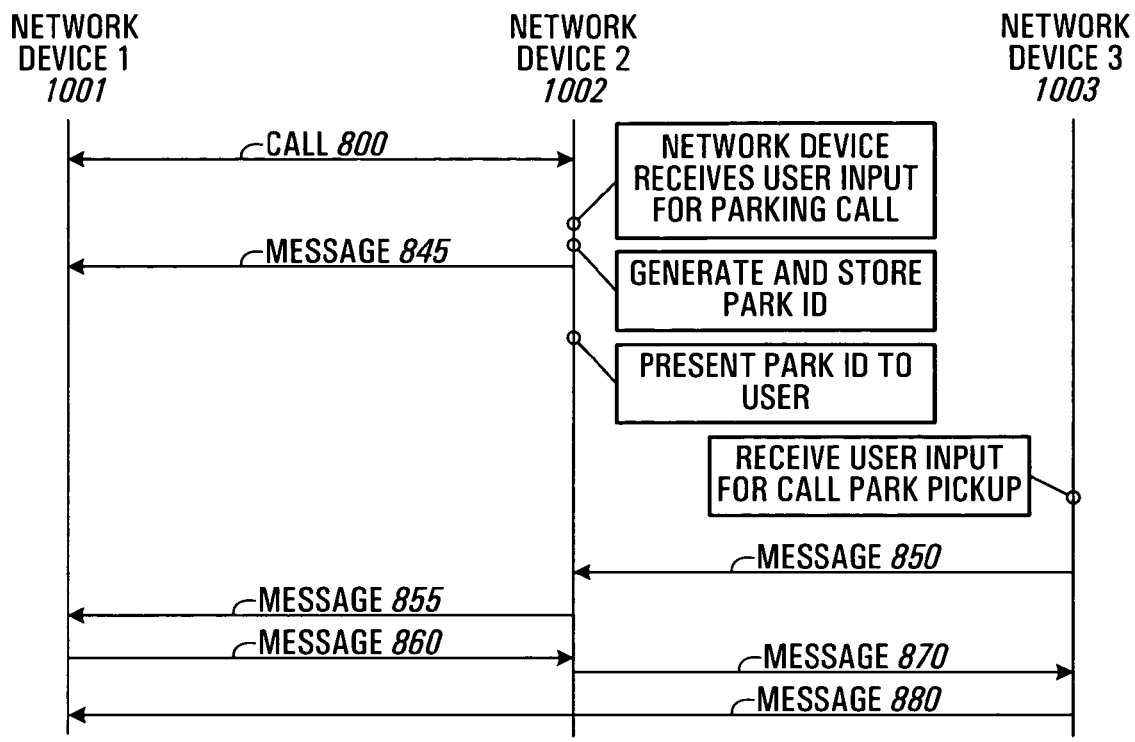
FIG. 8C is a signal flow diagram of the basic steps which take place in a call park and call park pickup scenario, according to another embodiment of the invention.

Referring to FIG. 8C, shown is a signal flow diagram of the basic steps which take place in a call park and call park pickup scenario, according to another embodiment of the invention. In FIG. 8C, there is the call 800 between the first network device 1001 and the second network device 1002 with its associated identifier. Responsive to a user at the second network device 1002 initiating call park of the call 800, the second network device 1002 generates a park ID containing a reference to the second network device 1002 and a reference to the parked call, and stores the park ID. In some implementations, the park ID contains the reference to the call only. The second network device 1002 also sends a message 845 to the first network device 1001 indicating that the call 800 is to be parked. In some implementations, the message 845 contains the identifier of the call 800. Furthermore, in some implementations there is no message 845 being sent. The second network device 1002 presents the park ID to the user by way of user interface 1022. The reference to the second network device 1002 is any suitable identifier of the second network device 1002 such as a DN of the second network device 1002 for example. The reference to the parked call 800 is any suitable identifier of the call 800 allowing the second network device 1002 to identify the call 800. In some implementations, the reference to the call is a password for allowing access to the call 800. Preferably, the park ID contains a DN as the reference to the second network device 1002 allowing the park ID to be displayed using few characters.

The user moves to the third network device 1003 and initiates call park pickup of the call 800 at the third network device 1003 by entering the park ID by way of user interface 1020. The third network device 1003 sends a message 850 to the second network device 1002 containing the reference to the call 800. Responsive to receiving the message 850 the second network device 1002 looks up the identifier of the call 800 and sends the message 855 containing the identifier to the first network device 1001. Furthermore, in some implementations messages 850 and 855 contain information on the third network device 1003 for use by the first network device 1001 in establishing a media path with the third network device 1003. The information contained in messages 850 and 855 might include for example a port and IP address for a channel of the third network device 1003. Alternatively, a default port address can be used.

Responsive to receiving the message 855, the first network device 1001 sends a message 860 containing the identifier of the call 800 to the second network device 1003. The second network device 1002 then sends a message 870 containing the identifier of the call 800 to the third network device 1003. In some implementations the messages 860, 870 also contain information on the first network device 1001 for use by the third network device 1003 in establishing the media path with the first network device 1001. The information contained in messages 860, 870 might include for example a port and IP address for a channel of the first network device 1001.

Responsive to receiving the message 870, the third network device 1003 sends a message 880 containing the identifier of the call 800 to the first network device 1001 for establishing a media path with the first network device 1001. In some implementations the message 880 contains information on the third network device 1003 for use by the first network device 1001 in establishing the media path with the third network device 1003. The information contained in message 880 might include for example a port and IP address for a channel of the third network device 1003. Alternatively, a default port address can be used.

The invention is not limited to having the messages 855, 860 contain the identifier of the call 800 and in some implementations for example where the second network device 1002 can handle only one call at a time there is no identifier of the call contained within messages 855, 860.

Figure 8D:
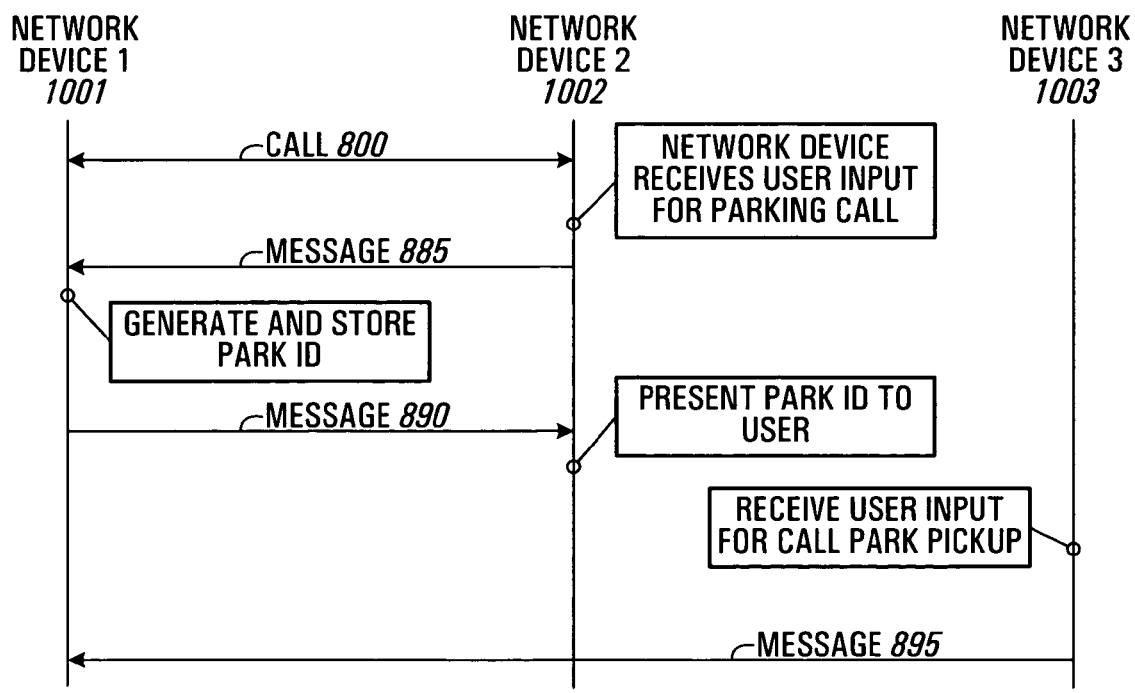
FIG. 8D is a signal flow diagram of the basic steps which take place in a call park and call park pickup scenario, according to another embodiment of the invention.

FIG. 8D is a signal flow diagram of the basic steps which take place in a call park and call park pickup scenario, according to another embodiment of the invention. In FIG. 8D, there is the call 800 between the first network device 1001 and the second network device 1002. Responsive to a user at the second network device 1002 initiating call park of the call 800, the second network device 1002 sends a message 885 to the first network device 1001 indicating that the call 800 is to be parked. Responsive to receiving the message 885, the first network device 1001 parks the call, generates and stores a park ID containing a reference to the first network device 1001 and a reference to the parked call. The first network device 1001 sends a message 890 to the second network device 1002 containing the park ID. Responsive to receiving the message 890, the second network device 1002 presents the park ID to the user by way of user interface 1022.

The user moves to the third network device 1003 and initiates call park pickup of the call 800 at the third network device 1003 by entering the park ID by way of user interface 1020. The third network device 1003 identifies the call 800 using the park ID stored and sends a message 895 to the first network device 1001 containing the reference to the call 800 for establishing a media path with the first network device 1001.

In some implementations the message 895 also contains information on the third network device 1003 for use by the first network device 1001 in establishing the media path with the third network device 1003. The information contained in message 895 might include for example a port address for a channel of the third network device 1003. Alternatively, a default port address can be used.

In some implementations, the park ID contains the reference to the call and a reference to the second network device 1002, and the message 895 is replaced with two messages. One of the two messages is sent from the third network device 1003 to the second network device 1002 and the other message is sent from the second network device 1002 to the first network device 1001. Alternatively, in some implementations the park ID contains a reference to the call 800 only and there is no reference to the first network device 1001 or the second network device 1002. In such implementations, the user remembers the park ID and notes for example the DN of the second network device 1002. The user then enters the park ID and the DN at the third network device 1003.

Figure 8E:
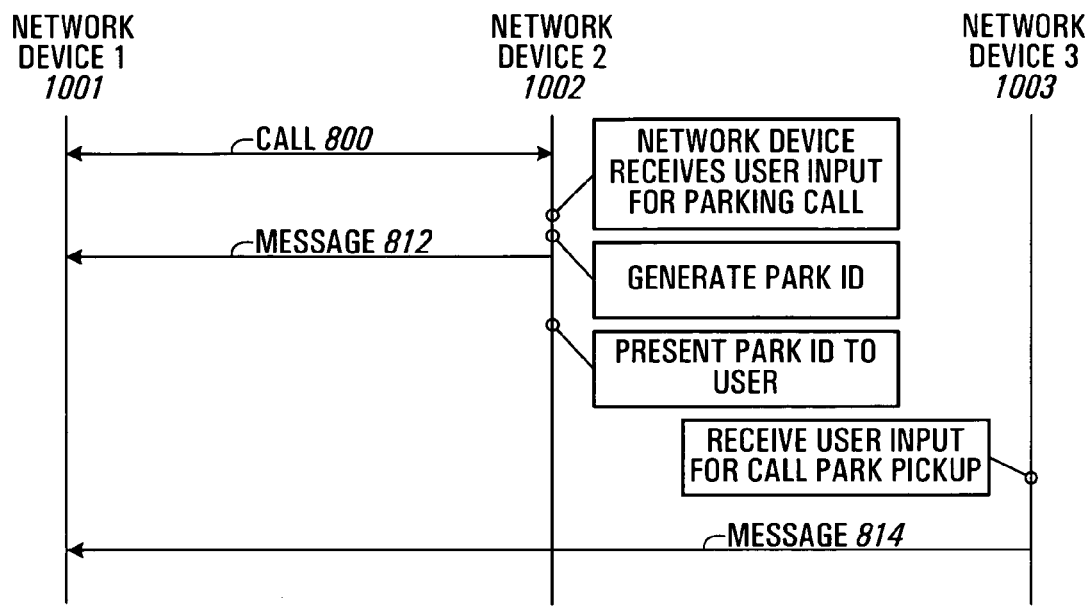
FIG. 8E is a signal flow diagram of the basic steps which take place in a call park and call park pickup scenario, according to another embodiment of the invention.
Figure 8F:
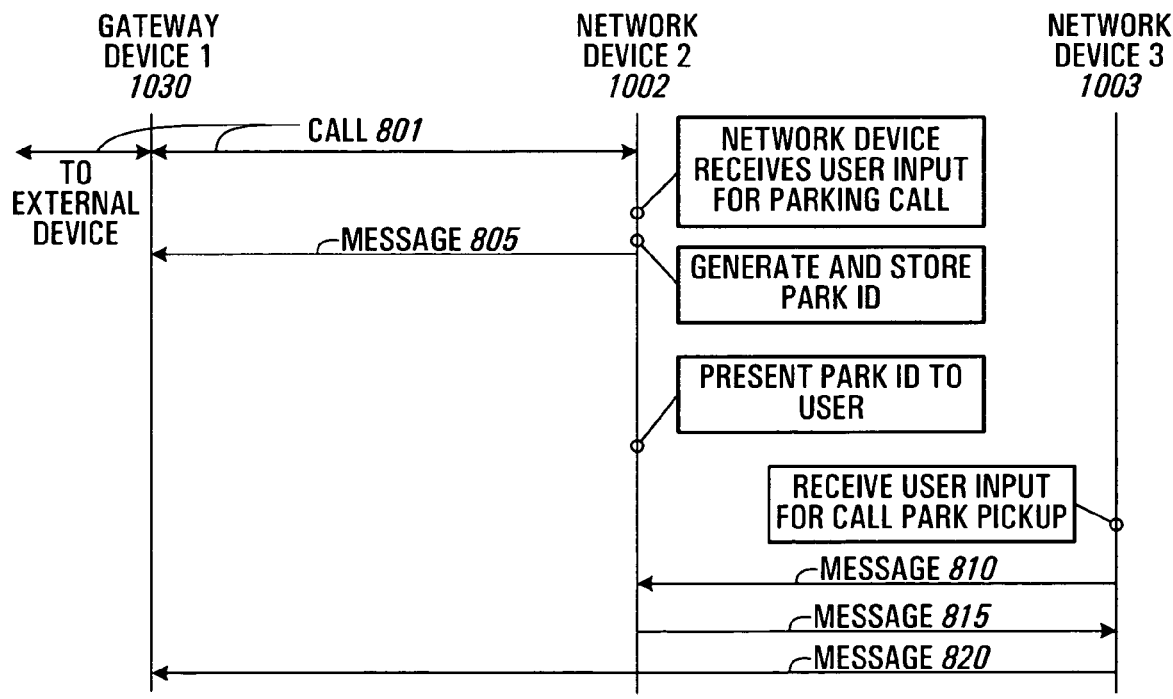
FIG. 8F is a signal flow diagram of the basic steps which take place in a call park and call park pickup scenario, according to another embodiment of the invention.

Referring to FIG. 8E, shown is a signal flow diagram of the basic steps which take place in a call park and call park pickup scenario, according to another embodiment of the invention. In FIG. 8E, there is the call 800 between the first network device 1001 and the second network device 1002. Responsive to a user input from a user at the second network device 1002 initiating call park of the call 800, the second network device 1002 generates a park ID containing a reference to the first network device 1001 and a reference to the call 800 and presents the park ID to the user. In particular, as will be discussed in further details below, the reference to the call 800 generated allows the first network device 1001 to correctly identify the call 800 so that the network device 1001 does not receive two or more requests for picking up parked calls with the parked calls being identified with the same reference. The second network device 1002 also sends a message 812 to the first network device 1001 indicating that the call 800 is to be parked.

The user moves to the third network device 1003 and initiates call park pickup of the call 800 at the third network device 1003 by entering the park ID by way of user interface 1020. The third network device 1003 sends a message 814 to the first network device 1001 containing the reference to the call 800.

In some implementations, the reference to the call 800 contains a first field identifying the call 800 with the first network device 1001 at the second network device 1002 and a second field that contains a reference to the second network device 1002. For example, if the call 800 is the only call with the first network device 1001 at the second network device 1002 the first field might contain a numeral 1; however, if the call 800 is a second or third call with the first network device 1001 the first field might contain 2 or 3, respectively. The reference to the second network device 1002 contained in the second field might be for example a DN corresponding to the second network device; however, it is to be understood that any suitable reference to the second network device 1002 may be used. It is also to be understood that although numerals are used for the first and second fields in the example other characters can be used. With the reference to the call containing the two fields, upon receipt of the message 814 the first network device 1001 identifies the call 800. In some implementations the reference to the call 800 has a third field that contains a reference to the first network device 1001. Alternatively, the reference to the first network device 1001 can form part of the park ID separately from the reference to the call.

In another implementation, each network device 1001, 1002, 1003 maintains a list of parked calls and references to parked calls over the network 1000. In such an implementation the second network device 1002 might generate a reference to the call 800 that is not already used for other parked calls by looking-up the list of references to parked calls. Once the reference to the call 800 is generates it is broadcast to the network devices 1001, 1003 so that their respective list of references to parked calls can be updated. In such implementations, upon receipt of the message 814 containing the reference to the call 800 the first network devie 1001 identifies call 800 by looking up its list using the reference to the call 800.

As discussed above, in some implementations the park ID contains the reference to the call 800 and a reference to the second network device 1002. The reference to the second network device 1002 might be separate from the reference to the call 800 or form part of the reference to the call 800.

Furthermore, in some implementations the message 814 is replaced with two messages. One of the two messages is sent from the third network device 1003 to the second network device 1002 and the other message is sent from the second network device 1002 to the first network device 1001. Alternatively, in some implementations the park ID contains a reference to the call 800 only and there is no reference to the first network device 1001 or the second network device 1002.

Finally, in some implementations there is no message 812 being sent indicating to the first network device 1001 that the call 800 is to be parked.

Figure 7B:
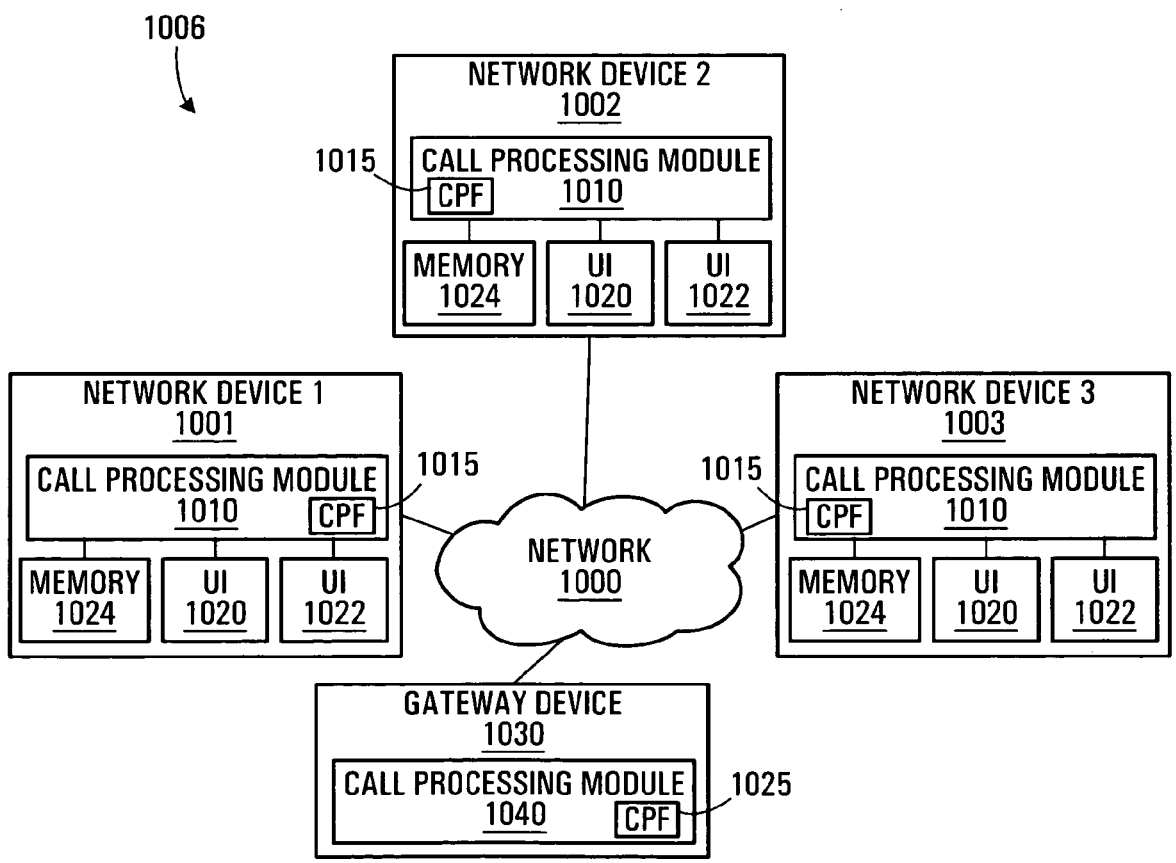
FIG. 7B is another basic block diagram of a distributed peer-to-peer network.

Referring back to FIG. 7A, in another embodiment the system 1005 also has a gateway device connected to the network 1005 with the gateway device having at least some call park and call park pickup functionality. As shown in FIG. 7B, there is a gateway device 1030 having a call processing module 1040, which is connected to the network 1000. The gateway device 1030 might be a TTI (Thin Trunk Interface) for example. The gateway device 1030 provides access to the network 1000 for external calls external to the network 1000. For external calls to and from external network devices (not shown) outside the network 1000, the gateway device 1030 is adapted to provide local call park and call park pickup functionality for the external network devices outside the network 1000.

In particular, the call processing module 1040 is capable of directing calls between the network devices 1001, 1002, 1003 and the external network devices outside the network 1000. Furthermore, the call processing module 1040 of the gateway device 1030 has a CPF 1025 that participates in call park and call park pickup of calls to and from the external network devices by providing local call park and call park pickup functionality. For example, in FIG. 8F a signaling sequence similar to that of FIG. 8A is shown except that the first network device 1001 of FIG. 8A is replaced with the gateway device 1030 and the call 800 is replaced with a call 801. In this example, the call 801 is between an external device (not shown) and the second network device 1002, and is directed through the gateway device 1030. The gateway device 1030 provides call park and call park pickup functionality. In particular, the gateway device 1030 participates in call park and call park pickup of the call 801 as a participant other than the initiator of the call park of the call 801 (the second network device 1002) and the initiator of the call park pickup of the call 801 (the third network device 1003). It is to be clearly understood that the invention is not limited to the gateway device 1030 using the signaling sequence of FIG. 8F for providing call park and call park pickup functionality on behalf of external network devices. In particular, for example other signaling sequences similar to those of FIGS. 8B to 8D may be used in which the gateway device 1030 follows signaling sequences similar to those of the first network device 1001.

Further embodiments will be now described with reference to FIGS. 9, 10, and 14 to 16. In FIGS. 9, 10, and 14 to 16 messaging between network devices will be described for example implementations in the context of SIP (Session Initiation Protocol); however, the invention is not limited to implementations using SIP. For example, in some implementations the H.323 standard is used. Furthermore, in FIGS. 9, 10, and 14 to 16, call park and call park pickup is applied to network devices 1001, 1002, 1003 of FIGS. 7A and 7B; however, the call park and call park pickup functionality is also equally applicable to any network device such as terminal sets 101, 102, 103, 104, 105 of FIG. 1 for example.

Figure 9:
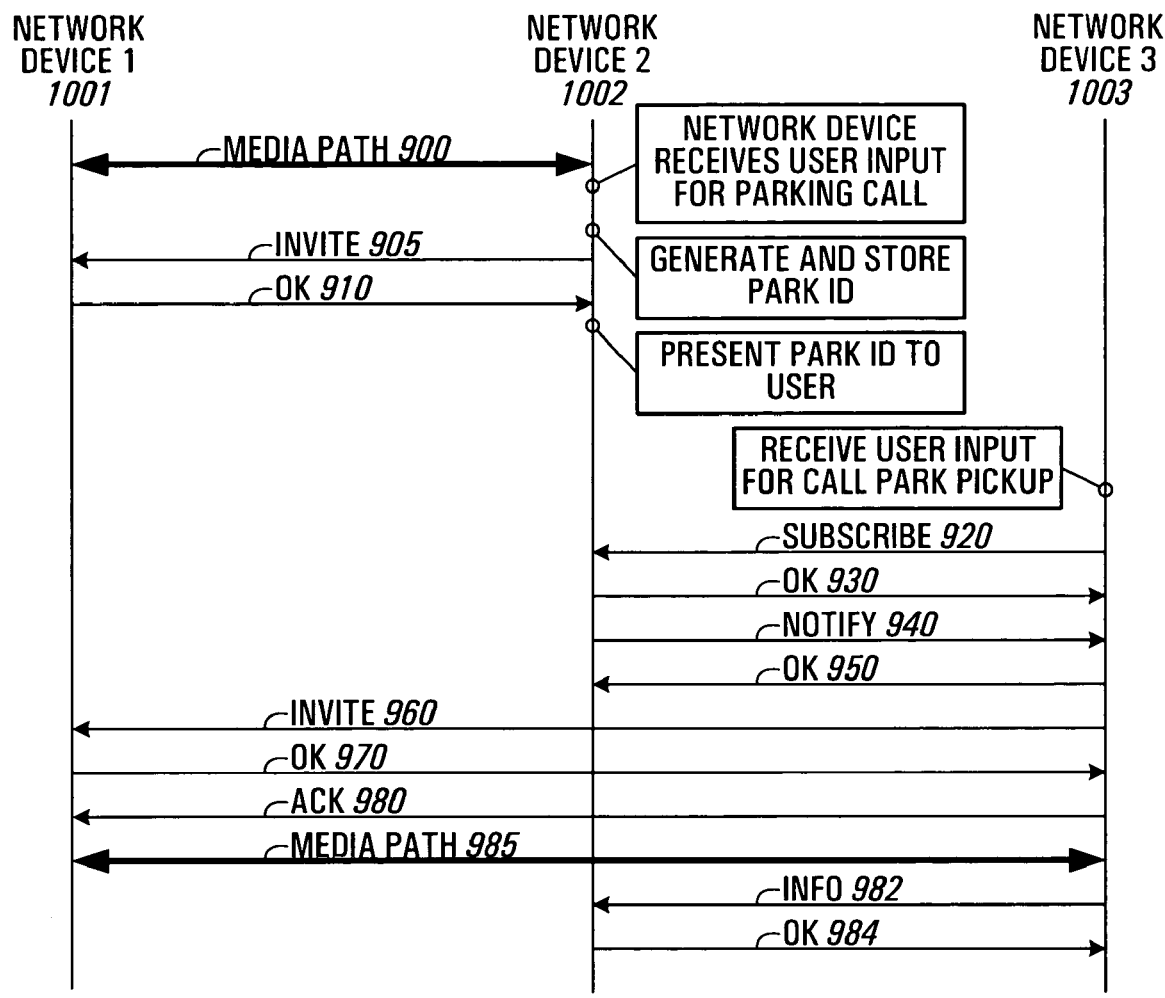
FIG. 9 is a signal flow diagram of an example implementation of call park and call park pickup of a call in a distributed peer-to-peer network, according to another embodiment of the invention.

Referring to FIG. 9, shown is a signal flow diagram of an example implementation of call park and call park pickup of a call in a distributed peer-to-peer network, according to another embodiment of the invention. In the embodiment of FIG. 9, the first network device 1001 is in media communication with the second network device 1002 in a call for which a media path 900 is established. A user at the second network device 1002 wishes to park the call and then later retrieve the parked call from the third network device 1003. The user at second network device 1002 parks the call by selecting a park command (physical or soft key) on the second network device 1002. Second network device 1002 places the call on park by sending an INVITE message 905 to the first network device 1001 and waits for confirmation from the first network device 1001 in an OK message 910. The second network device 1002 generates, stores and presents a park ID to the user. In this example the park ID is a combination of the DN (Directory Number) of the second network device 1002 and a reference to the parked call at the second network device 1002.

The user then initiates call park pickup of the call at the third network device 1003 by selecting an appropriate hard or soft key on the third network device 1003 and by entering the park ID. The third network device 1003 extracts the DN of the second network device 1002 from the park ID and sends a SUBSCRIBE message 920 containing the park ID to the second network device 1002 and the second network device 1002 responds with an OK message 930. The third network device 1003 then waits for a Notify message 940 from the second network device 1002. The SUBSCRIBE message 920 contains the park ID and an event type indicator which indicates that park pickup is requested. The second network device 1002 receives and verifies the park ID. The second network device 1002 then retrieves call information of the parked call including a callID, packages the call information in the NOTIFY message 940 and sends the Notify message 940 to third network device 1003. The call ID serves as an identifier of the call at both the first and the second network devices 1001, 1002. The call ID is sent to the third network device 1003 from the second network device 1002 by way of the NOTIFY message 940 and the user need not remember and input the call ID at the third network device 1003. This is advantageous in that the call ID is a network wide unique identifier which can be greater than 20 digits, whereas the park ID might have, for example, 4 to 7 digits. Again, it is to be clearly understood that the park ID may have more or fewer characters.

Upon receipt of Notify message 940, the third network device 1003 extracts the call ID and the DN of the first network device 1001. The third network device 1003 then sends an OK message 950 to the second network device 1002 acknowledging receipt of the Notify message 940. Having the DN of the first network device 1001, the third network device 1003 sends an INVITE message 960 to the first network device 1001 with instructions to replace the call to the second network device 1002 with a call with the third network device 1003. The INVITE message 960 contains the call ID for the parked call to allow the first network device 1001 to identify which call needs to be redirected. Upon receipt of the INVITE message 960, the first network device 1001 locates the call using the call ID and switches its internal state, including media path address and ports, to point to the third network device 1003 and sends an OK message 970 to the third network device 1003 indicating acceptance of the INVITE message 960. The third network device 1003 responds with an ACK message 980 to complete its media negotiations with the first network device 1001, a media path 985 is established between network devices 1001, 1003, and the call is successfully picked up. At this stage, the second network device 1002 is no longer part of the call and is informed that the parked call has been successfully picked up. In particular, the third network device 1003 sends an INFO message 982 to the second network device 1002 to indicate that the call park pickup was successful. The second network device 1002 responds with an OK message 984 acknowledging receipt of the INFO message 982.

Figure 10:
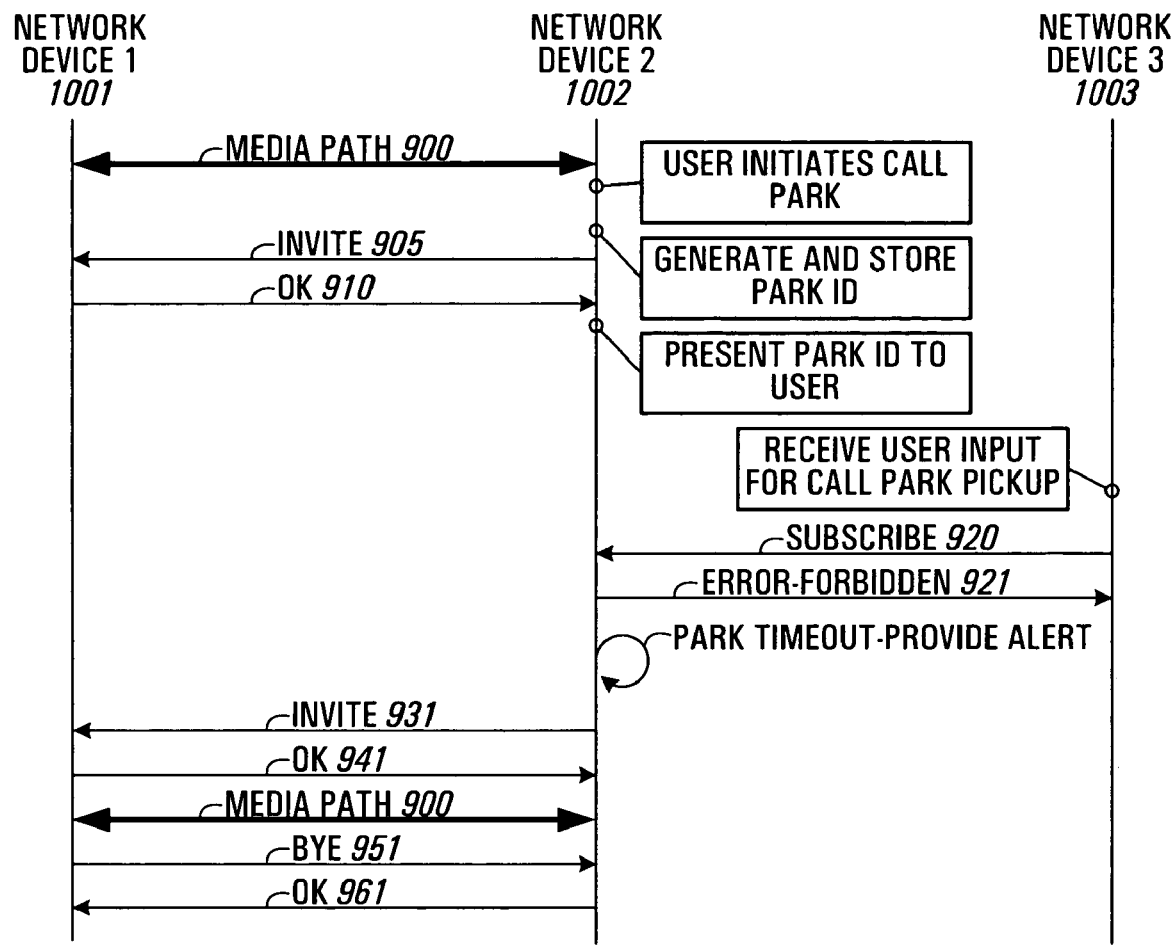
FIG. 10 is a signal flow diagram for the example implementation of FIG. 9 when an invalid park ID (IDentification) is used.

Referring to FIG. 10, shown is a signal flow diagram for the example implementation of FIG. 9 when an invalid park ID is used. With reference to FIG. 7A the media path 900 is established as described above with reference to FIG. 9. A user at the second network device 1002 parks the call and initiates a call park pickup of the call at the third network device 1003 as described above with reference to FIG. 9. However, in this case the user enters the wrong park ID. In particular, in this special case the entered park ID contains the correct information for identifying second network device 1002 but contains an incorrect reference to the call. The third network device 1003 extracts the DN number of the second network device 1002 and the incorrect reference to the call. The third network device 1003 then sends a SUBSCRIBE message 920, which contains the incorrect reference to the call, to second network device 1002 and waits for a response. The second network device 1002 receives the SUBSCRIBE message 920 containing the incorrect reference and cannot identify the parked call between network devices 1001 and 1002. The second network device 1002 then responds to the third network device 1003 with an error message 921 indicating that it could not associate the park ID sent in the SUBSCRIBE message 920 with any existing call. The user may then return to the second network device 1002 and retrieve the call or enter the correct park ID; however, in the example of FIG. 10, the parked call is left for a long period of time and a call park timer at the second network device 1002 expires. In such a case, the call processing module 1010 of the second network device 1002 provides an alert at the second network device 1002. The parked call between network devices 1001 and 1002 is re-established when the user goes off-hook at the second network device 1002. To re-establish the parked call, the second network device 1002 sends an INVITE message 931 to re-establish media channels for transmission in both directions between network devices 1001 and 1002. The first network device 1001 responds to the INVITE message 931 with an OK message 941 and the media path 900 is re-established. In the example of FIG. 10, when the conversation is finished the user at the first network device 1001 first hangs up and the first network device 1001 sends a BYE message 951 to the second network device 1002 to end communication. The second network device 1002 responds to the first network device 1001 with an OK message 961 and the call is terminated.

In the illustrative example of FIG. 10, an incorrect reference to the call was entered as part of the park ID; however, in other cases the DN of the park ID may be incorrect. In such a case the SUBSCRIBE message 920 is directed to an incorrect network device which fails to associate a parked call with the park ID and responds with an error message back to the third network device 1003.

Figure 11:
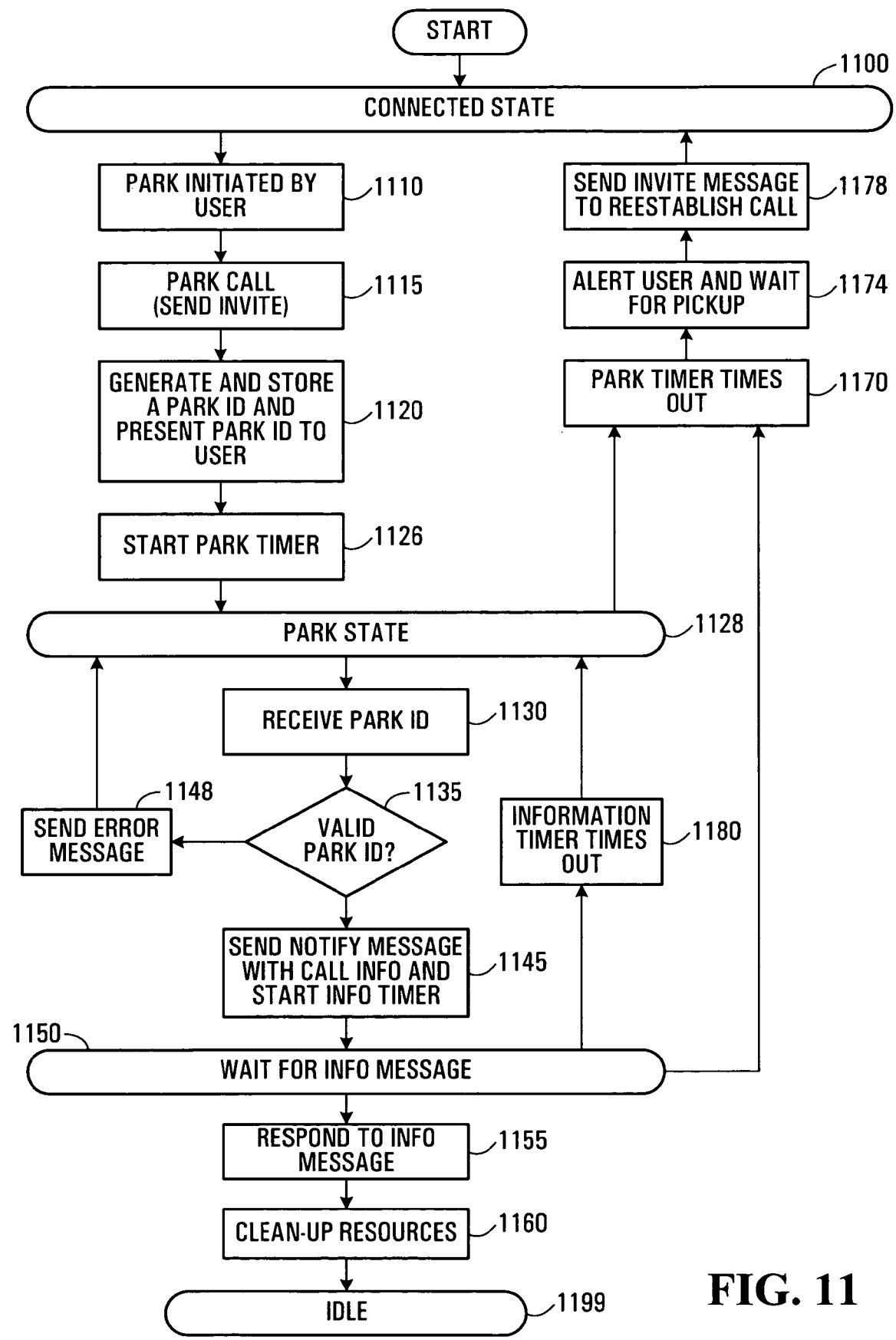
FIG. 11 is a flow chart of steps followed by a network device during a call park and call park pickup of a call according to the implementation of FIGS. 9 and 10, the network device being a network device at which call park is initiated.

Referring to FIG. 11, shown is a flow chart of steps followed by the second network device 1002 of FIGS. 7A and 7B during call park and pickup of a call, according to the implementation of FIGS. 9 and 10. With reference to FIGS. 7A and 11, at step 1100 the second network device 1002 is in a connected state with the first network device 1001 and a user at the second network device 1002 initiates a call park for a call (step 1110) between network devices 1001 and 1002. At step 1115, the second network device 1002 sends an INVITE message to the first network device 1001 to place the call on park and at step 1120 the second network device 1002 generates and stores a park ID. At step 1120, the park ID is also presented to the user at the second network device 1002. A park timer is then started (step 1126) and the call enters into a park state (step 1128). The user at the second network device 1002 notes the park ID, moves to the third network device 1003 and initiates a call park pickup as is described below with reference to FIG. 12. After the user has initiated the park pickup from third network device 1003, the second network device 1002 receives the park ID as part of a subscribe message from third network device 1003 (step 1130) and checks the validity of the park ID (step 1135). At step 1135, the call processing module 1010 checks to see if there is a call associated with the park ID. If there is no call associated with the park ID then the park ID is invalid; otherwise, it is valid. If the park ID is valid, the call processing module 1010 of the second network device 1002 the call information including a call ID and media information such as media type, address and port of a media connection for the parked call (step 1145). At step 1145, the call processing module 1010 sends the call information as part of a Notify message and starts an information timer. The call processing module 1010 then waits for an INFO message (step 1150) from the third network device 1003.

At step 1135, if the park ID is invalid the second network device 1002 sends an ERROR message (step 1148) to the third network device 1003 and the call returns to a parked state (step 1128) where it waits for another attempt by the user to enter the park ID or waits for the park timer to timeout (step 1170).

In the case that the park ID is valid, call information is received by the third network device 1003 and the parked call is picked up as is described below with reference to FIG. 12. When the call pickup of the call is complete at the third network device 1003, an INFO message is sent from the third network device 1003 and received by the second network device 1002 to indicate that call pickup has been successfully completed and the second network device 1002 sends an OK message to the third network device 1003 (step 1155). A cleanup of call resources is then performed (step 1160) before the second network device 1002 returns to an idle state (step 1199).

At step 1170 the park timer times out. The second network device 1002 then provides an alert and waits for pickup of the call (step 1174). At step 1178 the second network device 1002 sends an INVITE message to the first network device 1001 for re-establishing the call when the call is picked up.

Figure 12:
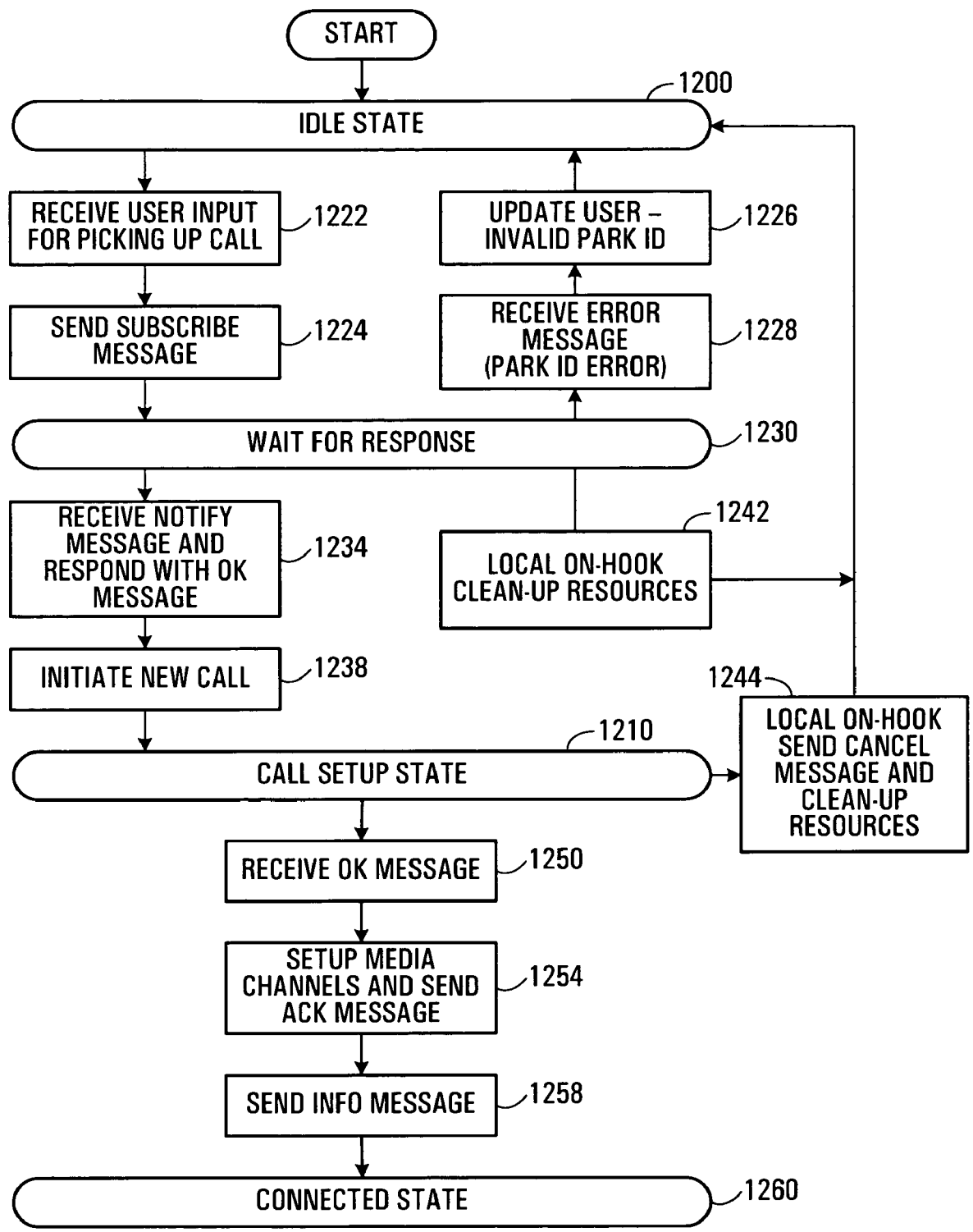
FIG. 12 is a flow chart of steps followed by a network device during a call park and call park pickup of a call according to the implementation of FIGS. 9 and 10, the network device participating in the call park pickup of the call as an initiator of the call park pickup of the call.

Referring to FIG. 12, shown is a flow chart of steps followed by the third network device 1003 of FIGS. 7A and 7B during a call park and call park pickup of a call according to the implementation of FIGS. 9 and 10. At step 1200, the third network device 1003 is in an idle state. A user at the third network device 1003 initiates call park pickup of a parked call (step 1222). The third network device 1003 then sends a SUBSCRIBE message to the second network device 1002 (step 1224), and waits for a response to the SUBSCRIBE message (step 1230). The response is in the form of a NOTIFY message or an ERROR message. In the case the ERROR message is received (step 1228), the ERROR message is presented to the user at the third network device 1003 (step 1226) and the third network device 1003 returns to the idle state (step 1200). In the case the NOTIFY message is received (step 1234), call information contained in the NOTIFY message which includes a call ID of the parked call is used to initiate a new call. The third network device 1003 responds with an OK message (step 1234) and initiates the new call to the first network device 1001 by sending an INVITE message to the first network device 1001 with instructions to replace the call with the second network device 1002 with a call with the third network device 1003 (step 1238). The third network device 1003 then enters a call setup state (step 1210). At step 1210, the third network device 1003 waits for a response from the first network device 1001. At step 1250, the third network device 1003 receives an OK message in response to the INVITE message, media channels are then setup and the third network device 1003 sends an ACK message to the first network device 1001 (step 1254). The third network device 1003 then sends an INFO message to the second network device 1002 to indicate that the call pickup was successful and the parked call was retrieved (step 1258). At step 1260, network devices 1001 and 1003 are then in a connected state.

At step 1230, if the user decides to terminate the park pickup of the call and the third network device 1003 goes on-hook then the call goes on-hook locally, resources are cleaned up (step 1242), and the call returns to the idle state (step 1200). Similarly, in the call setup state of step 1210, if the user decides to terminate the call pickup, then the third network device 1003 goes on-hook and a CANCEL message is sent to the first network device 1001 (step 1244) to cancel the INVITE message of step 1238. At step 1244 resources are also cleaned up and then the third network device 1003 returns to the idle state (step 1200).

Figure 13:
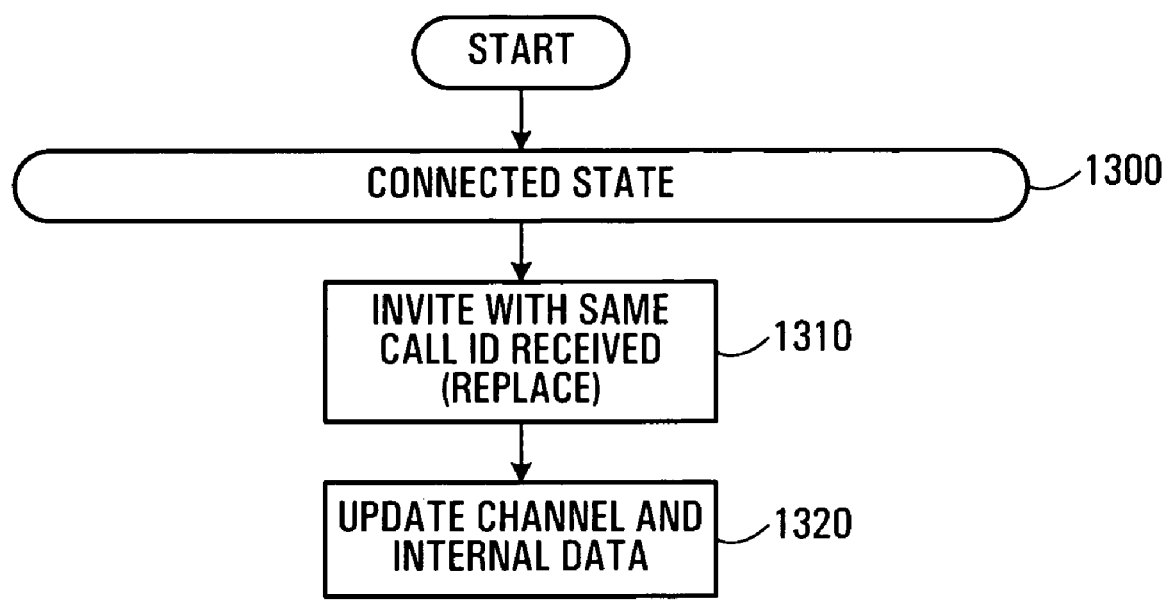
FIG. 13 is a flow chart of steps followed by a network device during a call park and call pickup of a call according to the implementation of FIGS. 9 and 10, the network device participating in the call park and call park pickup of the call as a receiving end of the call both prior to the call being parked and after the call being picked up.

Referring to FIG. 13, shown is a flow chart of steps followed by the first network device 1001 when a parked call is picked up. The first network device 1001 participates in the call park pickup of the call as a receiving end of the call both prior to the call being parked and after the call being picked up. At step 1300, the first network device 1001 is in a connected state with the second network device 1002 with the call being parked. An INVITE message is received from the third network device 1003 containing the call ID associated with the call between second network device 1002 and the first network device 1001 (step 1310). Upon receipt of this message, a media path address, a port and other internal data is updated (step 1320) to direct the connection for the call to the third network device 1003. The first network device 1001 then returns to the connected state 1300.

Figure 14:
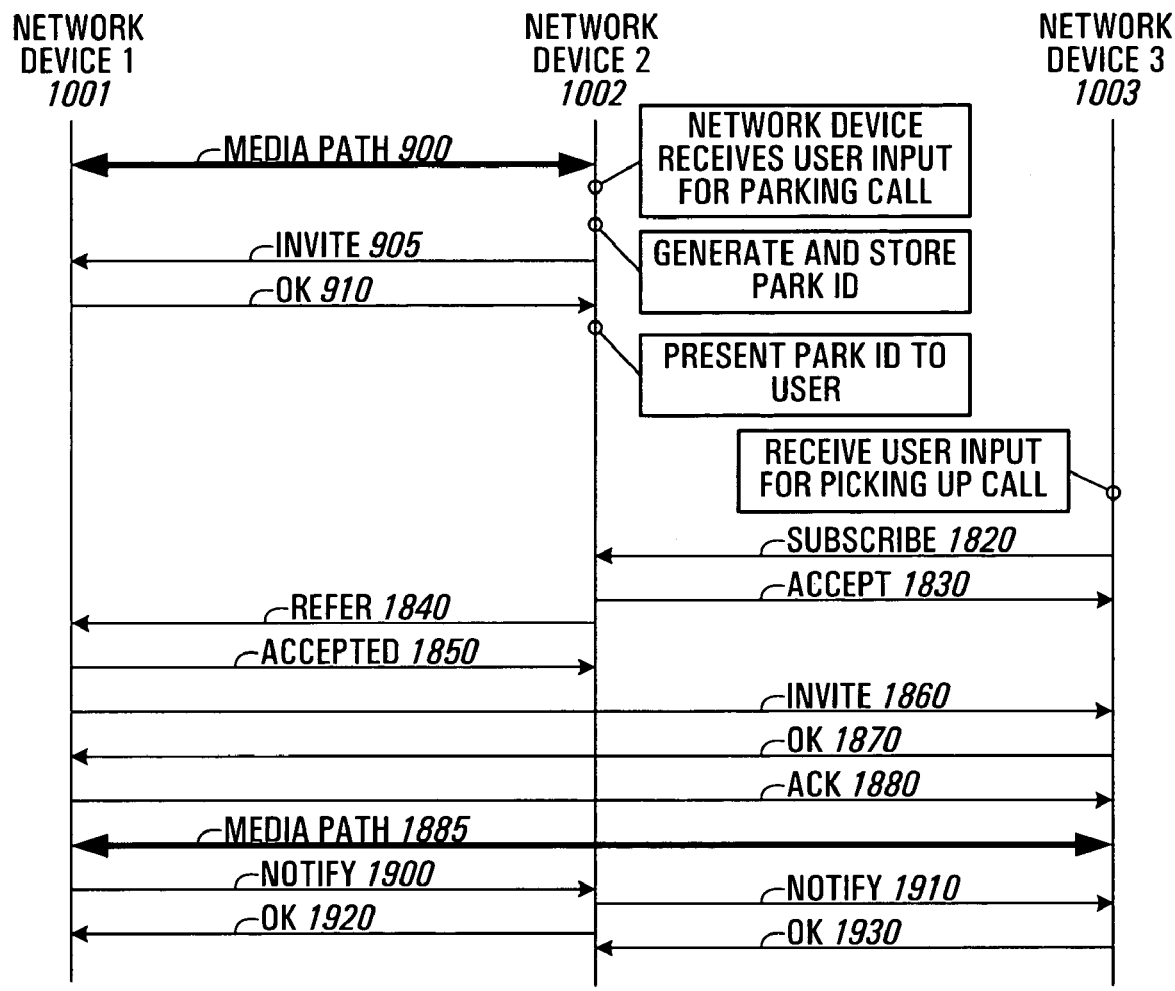
FIG. 14 is a signal flow diagram of an example implementation of call park and call park pickup of a call in a distributed peer-to-peer network, according to another embodiment of the invention.

Referring to FIG. 14, shown is a signal flow diagram of an example implementation of call park and call park pickup of a call in a distributed peer-to-peer network, according to another embodiment of the invention. The call park of a call between network devices 1001 and 1002 is initiated in the same way as described above with reference to FIG. 9. A user at the third network device 1003 initiates a call park pickup of the call by entering the park ID and the third network device 1003 sends a SUBSCRIBE message 1820 which contains the park ID and a call ID for a call leg between the third network device 1003 and the second network device 1002. Responsive to receiving the SUBSCRIBE message 1820, the second network device 1002 sends an accept message 1830 to the third network device 1003 to indicate acceptance of the SUBSCRIBE message 1820. A REFER message 1840 containing the call ID of the call leg between the third network device 1003 and the second network device 1002, and containing the DN of the third network device 1003 is sent to the first network device 1001. The first network device 1001 then accepts the refer request with an ACCEPT message 1850 and sends an INVITE message 1860 to the third network device 1003 with instructions to replace the call. The INVITE message 1860 contains preferred codec, address and port information for establishing a media channel. The third network device 1003 responds with an OK message 1870 which includes a media address and preferred codec and port information of the third network device 1003. The first network device 1001 acknowledges the OK message 1870 with an ACK message 1880 which is sent to the third network device 1003 and sets up a media path 1885 for media exchange to take place. Once the media path 1885 is established, a NOTIFY message 1900 is sent to inform the second network device 1002 that the refer request was successful and the second network device 1002 responds with OK message 1920. Similarly, the second network device 1002 sends a Notify message 1910 to inform the third network device 1003 that the subscription was successful and the third network device 1003 responds with an OK message 1930.

Figure 15:
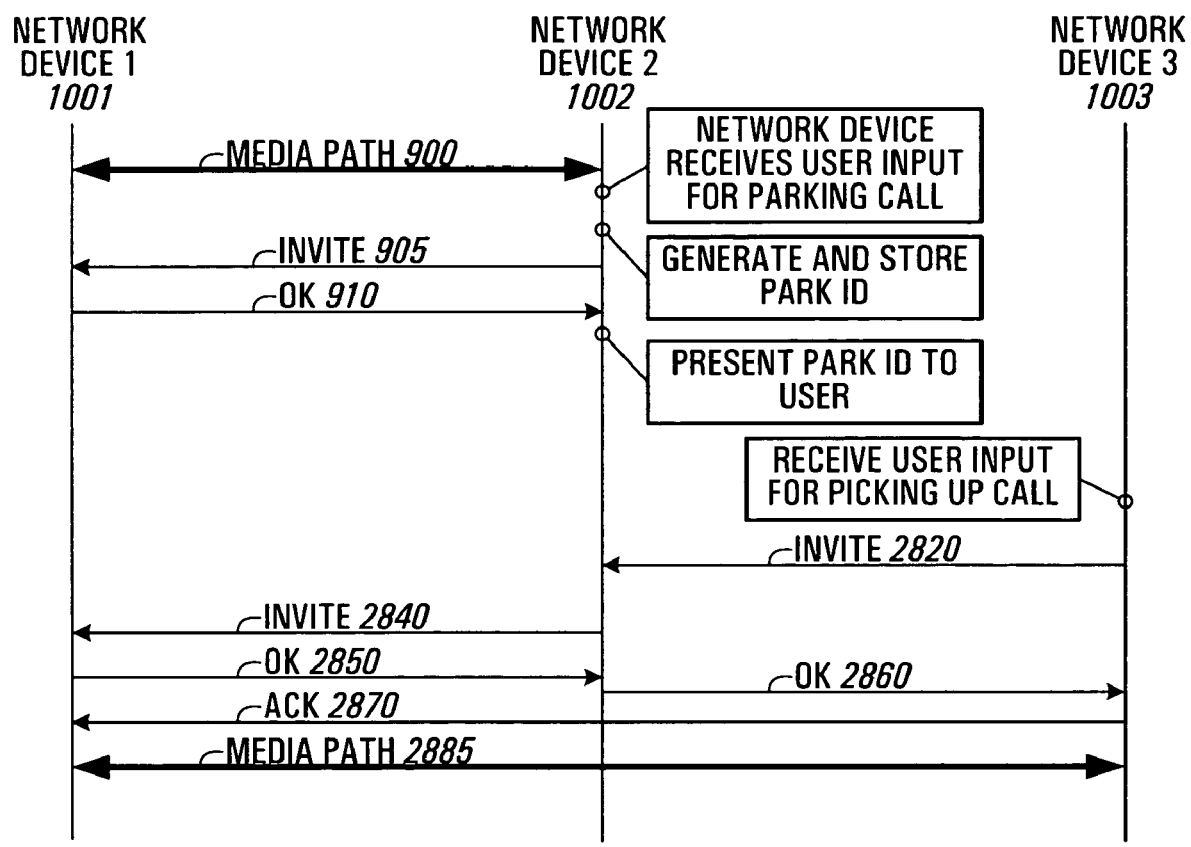
FIG. 15 is a signal flow diagram of an example implementation of call park and call park pickup of a call in a distributed peer-to-peer network, according to another embodiment of the invention.

Referring to FIG. 15, shown is a signal flow diagram of an example implementation of call park and call park pickup of a call in a distributed peer-to-peer network, according to another embodiment of the invention. The call park of a call between network devices 1001 and 1002 is initiated in the same way as described above with reference to FIG. 9. A user at the third network device 1003 initiates a call park pickup of the call and the third network device 1003 sends an INVITE message 2820 containing the park ID to the second network device 1002. The second network device 1002 then sends an INVITE message 2840 to the first network device 1001 with the INVITE message 2840 containing a reference to the third network device 1003 and media information such as codec type, a media address and a port number of the third network device 1003. Upon receipt of the INVITE message 2840, the first network device 1001 has information to directly setup a media path with the third network device 1003. The first network device 1001 responds to the second network device 1002 with an OK message 2850 providing its media information for establishing a media path. The second network device 1002 then sends an OK message 2860 to the third network device 1003 containing the media information received from the first network device 1001 and the call ID of the call between the first network device 1001 and the second network device 1002. Having the call ID and media information for establishing a media path with the first network device 1001, the third network device 1003 then sends an ACK message 2870 directly to first network device 1001 and a media path is established.

In yet another embodiment of the invention, the INVITE message 2840 includes instructions to replace the call ID for the call between network devices 1001 and 1002 with the call ID received from the INVITE message 2820. The OK response 2850 is then sent directly to the third network device 1003 and there is no OK messages 2850 and 2860 to and from the second network device 1002, respectively.

Figure 16:
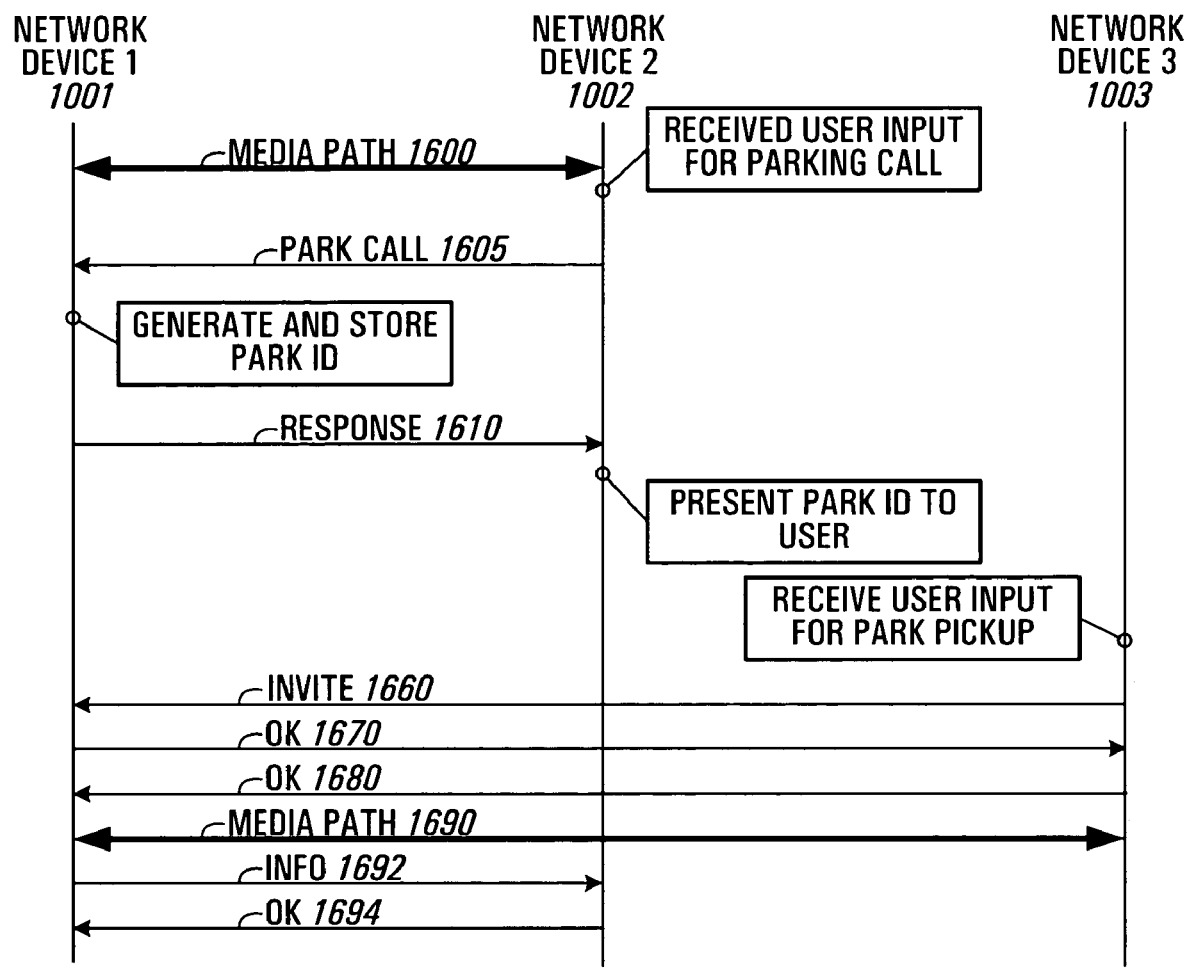
FIG. 16 is a signal flow diagram of an example implementation of call park and call park pickup of a call in a distributed peer-to-peer network, according to yet another embodiment of the invention.

Referring FIG. 16, shown is a signal flow diagram of an example implementation of call park and call park pickup in a distributed peer-to-peer network, according to another embodiment of the invention. There is a media path 1600 between network devices 1001 and 1002. Responsive to a user input at the second network device 1002 for parking a call associated with the media path 1600, the second network device 1002 sends a park call request 1605 to park the call between network devices 1001 and 1002. The first network device 1001 generates and stores a park ID containing a reference to the call and a reference to the first network device 1001. The first network device 1001 then sends a response message 1610 which contains the park ID. Responsive to receiving the response message 1610, the second network device 1002 presents the park ID to the user. The user then initiates call pickup of the call at the third network device 1003 and the third network device 1003 sends an INVITE message 1660 to the first network device 1001 for establishing a media path. The first network device 1001 sends an OK message 1670 and the third network device 1003 responds with an ACK message 1680. A media path 1690 is then established and the first network device 1001 sends an INFO message 1692 to the second network device 1002 to indicate that the call pickup is complete. The second network device 1002 responds with an OK message 1694.

Numerous modifications and variations of the present invention are possible in light of the above teachings. It is therefore to be understood that within the scope of the appended claims, the invention may be practiced otherwise than as specifically described therein.

The invention claimed is:

1. A method in a terminal set adapted to process a call between the terminal set and another terminal set, the method comprising, at the terminal set:
   generating a reference to the call for use in a call park pickup of the call; and
   participating in parking the call at the other terminal set.

2. A method according to claim 1 wherein the participating in parking the call at the other terminal set comprises:
   sending a message to the other terminal set indicating that the call is to be parked at the other terminal set.

3. A method according to claim 1 comprising:
   the terminal set receiving a request for parking the call, the reference being generated in response to the request; and
   displaying the reference.

4. A method in a terminal set adapted to process a call between the terminal set and another terminal set, the method comprising, at the terminal set:
   generating a reference to the call for use in a call park pickup of the call; and
   participating in parking the call at one of the terminal set and the other terminal set,
   wherein the other terminal set is a first other terminal set and wherein the reference to the call is generated in response to receiving a first message from the first other terminal set indicating the call is to be parked, the method comprising:
   a) responsive to receiving the first message:
   i) storing the reference to the call; and
   ii) sending a second message to the first other terminal set containing the reference to the call; and
   b) responsive to receiving a third message containing the reference to the call and a reference to a second other terminal set from the first other terminal set:
   i) identifying the call using the reference to the call stored; and
   ii) establishing a media path with the second other terminal set.

5. A method in a terminal set adapted to process a call between the terminal set and another terminal set, the method comprising, at the terminal set:
   generating a reference to the call for use in a call park pickup of the call; and
   participating in parking the call at one of the terminal set and the other terminal set,
   wherein the other terminal set is a first other terminal set and wherein the reference to the call is generated in response to receiving a first message from the first other terminal set indicating the call is to be parked, the method comprising:
   a) responsive to receiving the first message:
   i) storing the reference to the call; and
   ii) sending a second message to the first other terminal set containing the reference to the call; and
   b) responsive to receiving a third message containing the reference to the call from a second other terminal set:
   i) identifying the call using the reference to the call stored; and
   ii) establishing a media path with the second other terminal set.

6. A method according to claim 3 wherein the other terminal set is a first other terminal set, the method further comprising:
providing an other reference, the other reference being a reference to at least one terminal set of the terminal set and the first other terminal set; and
displaying the other reference.

7. A method according to claim 6 wherein the participating in parking the call at one of the terminal set and the other terminal set comprises:
responsive to receiving the request, sending a message to the first other terminal set indicating that the call is to be parked at the first other terminal set.

8. A method according to claim 5 wherein the other reference is a reference to the terminal set, the method further comprising:
storing the reference to the call; and
responsive to receiving a first message containing the reference to the call from a second other terminal set, identifying the call using the reference to the call stored and sending a second message to the second other terminal set containing an identifier of the call and a reference to the first other terminal set.

9. A method according to claim 8 wherein the second message contains information on the first other terminal set for use by the second other terminal set in establishing a media path with the first other terminal set.

10. A method in a terminal set adapted to process a call between the terminal set and a first other terminal set, the method comprising, at the terminal set:
generating a reference to the call for use in a call park pickup of the call; and
participating in parking the call at one of the terminal set and the first other terminal set,
wherein the terminal set receives a request for parking the call and the reference is generated in response to the request; and
displaying the reference, and
the method further comprises:
providing an other reference, the other reference being a reference to at least one terminal set of the terminal set and the first other terminal set; and
displaying the other reference, and
wherein the other reference is a reference to the terminal set, the method further comprising:
storing the reference to the call; and
responsive to receiving a first message from a second other terminal set containing the reference to the call, identifying the call using the reference to the call stored and sending a second message to the first other terminal set containing a reference to the second other terminal set.

11. A method according to claim 10 wherein the first message and the second message contain information on the second other terminal set for use by the first other terminal set in establishing a media path with the second other terminal set.

12. A method according to claim 10 wherein the first message and the second message contain a call ID (IDentification) of a call leg between the terminal set and the second other terminal set.

13. A method in a terminal set adapted to process a call between the terminal set and a first other terminal set, the method comprising, at the terminal set:
generating a reference to the call for use in a call park pickup of the call; and
participating in parking the call at one of the terminal set and the other terminal set,
the terminal set receiving a request for parking the call, the reference being generated in response to the request; and
displaying the reference,
providing an other reference, the other reference being a reference to at least one terminal set of the terminal set and the first other terminal set; and
displaying the other reference,
wherein the other reference is a reference to the terminal set, the method further comprising:
storing the reference to the call;
responsive to receiving a first message from the second other terminal set containing the reference to the call, identifying the call using the reference to the call stored and sending a second message to the first other terminal set indicating that the call is to be picked up; and
responsive to receiving a third message from the first other terminal set in response to the second message, sending a fourth message containing an identifier of the call, the fourth message being sent to the second other terminal set for indicating to the second other terminal set that a media path is to be established with the first other terminal set.

14. A method according to claim 13 wherein the first message and the second message contain information on the second other terminal set for use by the first other terminal set in establishing a media path with the second other terminal set and wherein the third message and the fourth message contain information on the first other terminal set for use by the second other terminal set in establishing a media path with the first other terminal set.

15. A method according to claim 13 wherein the second message contains a reference to the second other terminal set for use by the first other terminal set in establishing a media path with the second other terminal set and wherein the fourth message contains a reference to the first other terminal set.

16. A method according to claim 1 wherein the other terminal set is a first other terminal set, the method comprising upon receipt of a message from a second other terminal set containing at least one incorrect reference to the call and an incorrect reference to the terminal set, sending a message to the second other terminal set indicating an error in the incorrect reference to the call.

17. A method according to claim 1 comprising responsive to receiving a user input containing a reference to a parked call between a first other terminal set of the parked call other than the terminal set and a second other terminal set of the parked call other than the terminal set and containing a reference to at least one terminal set of the first other terminal set of the parked call and the second other terminal set of the parked call, establishing a media path with the first other terminal set of the parked call, call park of the parked call being initiated at the second other terminal set of the parked call.

18. A method according to claim 17 comprising:
sending a first message containing the reference to the parked call to the second other terminal set of the parked call; and
responsive to receiving a second message containing a reference to the first other terminal set of the parked call and an identifier of the parked call, sending a third message to the first other terminal set of the parked call for establishing a media path with the first other terminal set of the parked call.

19. A method in a terminal set adapted to process a call between the terminal set and another terminal set, the method comprising, at the terminal set:

generating a reference to the call for use in a call park pickup of the call;

participating in parking the call at one of the terminal set and the other terminal set;

responsive to receiving a user input containing a reference to a parked call between a first other terminal set of the parked call other than the terminal set and a second other terminal set of the parked call other than the terminal set and containing a reference to at least one terminal set of the first other terminal set of the parked call and the second other terminal set of the parked call, establishing a media path with the first other terminal set of the parked call, call park of the parked call being initiated at the second other terminal set of the parked call, sending a first message containing the reference to the parked call to the second other terminal set of the parked call; and responsive to receiving a second message from the first other terminal set of the parked call, establishing the media path with the first other terminal set of the parked call.

20. A method according to claim 17 comprising:
sending a message containing the reference to the parked call to one of the first other terminal set of the parked call and the second other terminal set of the parked call for establishing the media path.

21. A method in a terminal set adapted to process a call between the terminal set and another terminal set, the method comprising, at the terminal set:
generating a reference to the call for use in a call park pickup of the call; and
participating in parking the call at one of the terminal set and the other terminal set,
the terminal set receiving a request for parking the call, the reference being generated in response to the request;
displaying the reference, and
participating in call park pickup of a parked call between the terminal set and a first other terminal set of the parked call other than the terminal set by:
responsive to receiving a first message containing a reference to the parked call from one of the first other terminal set of the parked call and a second other terminal set of the parked call other than the terminal set, establishing a media path with the second other terminal set of the parked call for replacing the parked call with an other call with the second other terminal set of the parked call.

22. A method according to claim 21 comprising:
prior to the parked call being parked, responsive to receiving a second message from the first other terminal set of the parked call indicating that the parked call is to be parked, parking the parked call.

23. A method according to claim 21 wherein the first message is from the second other terminal set of the parked call and the reference to the call is an identifier of the parked call.

24. A method according to claim 21 wherein the first message is from the first other terminal set of the parked call and contains a reference to the second other terminal set of the parked call, the method comprising sending a second message to the second other terminal set of the parked call containing information for establishing the media path.

25. A method according to claim 21 wherein the first message is from the second other terminal set of the parked call.

26. A method according to claim 25 comprising: responsive to receiving a second message containing an identifier of the parked call from the first other terminal set of the parked call, sending a third message to the first other terminal set of the parked call containing the identifier and information for establishing the media path with the second other terminal set of the parked call.

27. A method according to claim 25 comprising:
responsive to receiving a second message containing an identifier of the parked call and a reference to the second other terminal set of the parked call from the first other terminal set of the parked call, sending a third message to the second other terminal set of the parked call containing information for establishing the media path with the second other terminal set of the parked call.

28. A method according to claim 1 wherein the terminal set is one of a packet based telephone, a video phone, a PC (Personal Computer), a PDA (Personal Digital Assistant), a soft phone, a wireless device, and a wireless telephone.

29. A method according to claim 1 wherein the terminal set is a VoIP (Voice over Internet Protocol) telephone.

30. A method according to claim 9 comprising:
responsive to receiving the first message from the first other terminal set, parking the call.

31. A terminal set adapted to process a call between the terminal set and another terminal set, the terminal set comprising:
a call park function adapted to:
generate a reference to the call for use in a call park pickup of the call; and
participate in parking the call at the other terminal set.

32. A terminal set according to claim 31 comprising a call processing module adapted to process the call, the processing module comprising the call park function.

33. A terminal set according to claim 32 wherein the call park function is adapted to provide instructions for sending a message to the other terminal set indicating that the call is to be parked at the other terminal set.

34. A terminal set according to claim 32 comprising:
a first user interface adapted to receive a request to park the call, the reference being generated in response to the request; and
a second user interface adapted to display the reference.

35. A terminal set adapted to process a call between the terminal set and another terminal set, the terminal set comprising:
a call park function adapted to:
generate a reference to the call for use in a call park pickup of the call; and
participate in parking the call at one of the terminal set and the other terminal set,
wherein the other terminal set is a first other terminal set and wherein the reference to the call is generated in response to receiving a first message from the first other terminal set indicating the call is to be parked, the call processing module being further adapted to:
a) responsive to receiving the first message:
i) store the reference to the call; and
ii) send a second message to the first other terminal set containing the reference to the call; and
b) responsive to receiving a third message containing the reference to the call and a reference to a second other terminal set from the first other terminal set:
i) identify the call using the reference to the call stored; and
ii) establish a media path with the second other terminal set.

36. A terminal set adapted to process a call between the terminal set and another terminal set, the terminal set comprising:

a call park function adapted to:
generate a reference to the call for use in a call park pickup of the call; and
participate in parking the call at one of the terminal set and the other terminal set,
wherein the other terminal set is a first other terminal set and wherein the reference to the call is generated in response to receiving a first message from the first other terminal set indicating the call is to be parked, the call processing module being further adapted to:
a) responsive to receiving the first message:
i) store the reference to the call; and
ii) send a second message to the first other terminal set containing the reference to the call; and b) responsive to receiving a third message containing the reference to the call from a second other terminal set:
i) identify the call using the reference to the call stored; and
ii) establish a media path with the second other terminal set.

37. A terminal set according to claim 34 wherein the other terminal set is a first other terminal set and wherein the call processing module is adapted to provide an other reference to the second user interface, the other reference being a reference to at least one terminal set of the terminal set and the first other terminal set, and wherein the second user interface is adapted to display the other reference.

38. A terminal set according to claim 37 wherein responsive to receiving the request the call processing module is adapted to send a message to the first other terminal set indicating that the call is to be parked at the first other terminal set.

39. A terminal set according to claim 36 wherein the other reference is a reference to the terminal set, the call processing module being adapted to:
store the reference to the call; and
responsive to receiving a first message containing the reference to the call from a second other terminal set, identify the call using the reference to the call stored and send a second message to the second other terminal set containing an identifier of the call and a reference to the first other terminal set.

40. A terminal set according to claim 39 wherein the second message contains information on the first other terminal set for use by the second other terminal set in establishing a media path with the first other terminal set.

41. A terminal set adapted to process a call between the terminal set and a first other terminal set, the terminal set comprising:
a call park function adapted to:
generate a reference to the call for use in a call park pickup of the call; and
participate in parking the call at one of the terminal set and the first other terminal set; and
a call processing module adapted to process the call, the processing module comprising the call park function;
a first user interface adapted to receive a request to park the call, the reference being generated in response to the request; and
a second user interface adapted to display the reference,
wherein the call processing module is adapted to provide an other reference to the second user interface, the other reference being a reference to at least one terminal set of the terminal set and the first other terminal set, and wherein the second user interface is adapted to display the other reference, and
wherein the other reference is a reference to the terminal set, the call processing module being adapted to:
store the reference to the call; and
responsive to receiving a first message from a second other terminal set containing the reference to the call, identify the call using the reference to the call stored and send a second message to the first other terminal set containing a reference to the second other terminal set.

42. A terminal set according to claim 41 wherein the first message and the second message contain information on the second other terminal set for use by the first other terminal set in establishing a media path with the second other terminal set.

43. A terminal set according to claim 41 wherein the first message and the second message contain a call ill (IDentification) of a call leg between the terminal set and the second other terminal set.

44. A terminal set adapted to process a call between the terminal set and a first other terminal set, the terminal set comprising:
a call park function adapted to:
generate a reference to the call for use in a call park pickup of the call; and
participate in parking the call at one of the terminal set and the first other terminal set; and
a call processing module adapted to process the call, the processing module comprising the call park function,
a first user interface adapted to receive a request to park the call, the reference being generated in response to the request; and
a second user interface adapted to display the reference,
wherein the call processing module is adapted to provide an other reference to the second user interface, the other reference being a reference to at least one terminal set of the terminal set and the first other terminal set, and wherein the second user interface is adapted to display the other reference,
wherein the other reference is a reference to the terminal set, the call processing module being adapted to:
store the reference to the call;
responsive to receiving a first message from the second other terminal set containing the reference to the call, identify the call using the reference to the call stored and send a second message to the first other terminal set indicating that the call is to be picked up; and
responsive to receiving a third message from the first other terminal set in response to the second message, send a fourth message containing an identifier of the call, the fourth message being sent to the second other terminal set for indicating to the second other terminal set that a media path is to be established with the first other terminal set.

45. A terminal set according to claim 44 wherein the first message and the second message contain information on the second other terminal set for use by the first other terminal set in establishing a media path with the second other terminal set and wherein the third message and the fourth message contain information on the first other terminal set for use by the second other terminal set in establishing a media path with the first other terminal set.

46. A terminal set according to claim 45 wherein the second message contains a reference to the second other terminal set for use by the first other terminal set in establishing a media path with the second other terminal set and wherein the fourth message contains a reference to the first other terminal set.

47. A terminal set adapted to process a call between the terminal set and another terminal set, the terminal set comprising:

a call park function adapted to:
generate a reference to the call for use in a call park pickup of the call; and
participate in parking the call at one of the terminal set and the other terminal set; and
a call processing module adapted to process the call, the processing module comprising the call park function;
a first user interface adapted to receive a request to park the call, the reference being generated in response to the request; and
a second user interface adapted to display the reference,
wherein the other terminal set is a first other terminal set and wherein upon receipt of a message from a second other terminal set containing at least one incorrect reference to the call and an incorrect reference to the terminal set, the call processing module is adapted to send a message to the second other terminal set indicating an error in the incorrect reference to the call.

48. A terminal set according to claim 32 wherein responsive to receiving a user input containing a reference to a parked call between a first other terminal set of the parked call other than the terminal set and a second other terminal set of the parked call other than the terminal set and containing a reference to at least one terminal set of the first other terminal set of the parked call and the second other terminal set of the parked call, the call processing module is adapted to establish a media path with the first other terminal set of the parked call, call park of the parked call being initiated at the second other terminal set of the parked call.

49. A terminal set adapted to process a call between the terminal set and another terminal set, the terminal set comprising:
a call park function adapted to:
generate a reference to the call for use in a call park pickup of the call; and
participate in parking the call at one of the terminal set and the other terminal set; and
a call processing module adapted to process the call, the processing module comprising the call park function,
wherein responsive to receiving a user input containing a reference to a parked call between a first other terminal set of the parked call other than the terminal set and a second other terminal set of the parked call other than the terminal set and containing a reference to at least one terminal set of the first other terminal set of the parked call and the second other terminal set of the parked call, the call processing module is adapted to establish a media path with the first other terminal set of the parked call, call park of the parked call being initiated at the second other terminal set of the parked call, and
wherein the call processing module is adapted to:
send a first message containing the reference to the parked call to the second other terminal set of the parked call; and
responsive to receiving a second message containing a reference to the first other terminal set of the parked call and an identifier of the parked call, send a third message to the first other terminal set of the parked call for establishing a media path with the first other terminal set of the parked call.

50. A terminal set adapted to process a call between the terminal set and another terminal set, the terminal set comprising:
a call park function adapted to:
generate a reference to the call for use in a call park pickup of the call; and
participate in parking the call at one of the terminal set and the other terminal set; and
a call processing module adapted to process the call, the processing module comprising the call park function,
wherein responsive to receiving a user input containing a reference to a parked call between a first other terminal set of the parked call other than the terminal set and a second other terminal set of the parked call other than the terminal set and containing a reference to at least one terminal set of the first other terminal set of the parked call and the second other terminal set of the parked call, the call processing module is adapted to establish a media path with the first other terminal set of the parked call, call park of the parked call being initiated at the second other terminal set of the parked call, and
wherein the call processing module is adapted to:
send a first message containing the reference to the parked call to the second other terminal set of the parked call; and
responsive to receiving a second message from the first other terminal set of the parked call, establishing the media path with the first other terminal set of the parked call.

51. A terminal set according to claim 48 wherein the call processing module is adapted to:
send a message containing the reference to the parked call to one of the first other terminal set of the parked call and the second other terminal set of the parked call for establishing the media path.

52. A terminal set adapted to process a call between the terminal set and another terminal set, the terminal set comprising:
a call park function adapted to:
generate a reference to the call for use in a call park pickup of the call; and
participate in parking the call at one of the terminal set and the other terminal set; and
a call processing module adapted to process the call, the processing module comprising the call park function,
a first user interface adapted to receive a request to park the call, the reference being generated in response to the request; and
a second user interface adapted to display the reference,
wherein the call processing module is adapted to participate in call park pickup of a parked call between the terminal set and a first other terminal set of the parked call other than the terminal set by:
responsive to receiving a first message containing a reference to the parked call from one of the first other terminal set of the parked call and a second other terminal set of the parked call other than the terminal set, establish a media path with the second other terminal set of the parked call for replacing the parked call with an other call with the second other terminal set of the parked call.

53. A terminal set according to claim 52 wherein the call processing module is adapted to:
prior to the parked call being parked, responsive to receiving a second message from the first other terminal set of the parked call indicating that the parked call is to be parked, park the parked call.

54. A terminal set according to claim 52 wherein the first message is from the second other terminal set of the parked call and the reference to the call is an identifier of the parked call.

55. A terminal set according to claim 52 wherein the first message is from the first other terminal set of the parked call and contains a reference to the second other terminal set of the parked call, the call processing module being adapted to send a second message to the second other terminal set of the parked call containing information for establishing the media path.

56. A terminal set according to claim 52 wherein the first message is from the second other terminal set of the parked call.

57. A terminal set according to claim 56 wherein the call processing module is adapted to:
responsive to receiving a second message containing an identifier of the parked call from the first other terminal set of the parked call, send a third message to the first other terminal set of the parked call containing the identifier and information for establishing the media path with the second other terminal set of the parked call.

58. A terminal set according to claim 56 wherein the call processing module is adapted to:
responsive to receiving a second message containing an identifier of the parked call and a reference to the second other terminal set of the parked call from the first other terminal set of the parked call, send a third message to the second other terminal set of the parked call containing information for establishing the media path with the second other terminal set of the parked call.

59. A terminal set according to claim 31 wherein the terminal set is one of a packet based telephone, a video phone, a PC (Personal Computer), a PDA (Personal Digital Assistant), a soft phone, a wireless device, and a wireless telephone.

60. A terminal set according to claim 31 wherein the terminal set is a VoIP (Voice over Internet Protocol) telephone.

61. A terminal set according to claim 40 wherein the call processing module is adapted to park the call in response to receiving the first message from the first other terminal set.

62. A system in a network comprising:
a plurality of terminal sets each capable of accessing the network, each terminal set comprising:
a first user interface adapted to receive user inputs from users for parking calls and user inputs for picking up calls;
a second user interface adapted to present to users references to the calls; and
a call park function adapted to generate references to call, the call park function further being adapted to:
a) as an initiator of a call park of a call between the terminal set and an other terminal set, receive a user input from the first user interface and present a reference to the call to a user using the second user interface;
b) as a participant in a call pickup of a call between the terminal set and a first other terminal set, responsive to receiving a message from one of the first other terminal set and a second other terminal set for picking up the call between the terminal set and the first other terminal set establish a media path with the second other terminal set; and
c) as a participant in a call pickup of a parked call between two other terminal sets other than the terminal set, responsive to receiving a user input containing a reference to the parked call and a reference to one of the two other terminal sets sending a message to said one of the two other terminal sets for establishing a media path with a first one of the two other terminal sets, call park of the parked call having been initiated at a second one of the two other terminal sets.

63. A system according to claim 62 comprising a gateway device capable of accessing the network and having a call park function adapted to provide call park functionality, the gateway device providing the call park functionality as a participant in a call park pickup of a call between an external terminal set external to the network and one of the plurality of terminal sets, call park being initiated at said one of the plurality of terminal sets call park pickup being initiated at another one of the plurality of terminal sets.

64. A system according to claim 63 wherein the gateway device is a thin trunk: interface.

65. An article of manufacture comprising:
a computer usable medium having computer readable program code means embodied therein for a terminal set adapted to process a call at the terminal set, the computer readable code means in said article of manufacture comprising:
computer readable code means for generating a reference to the call for use in a call park pickup of the call;
computer readable code means for participating in parking the call at the other terminal set.

66. An article of manufacture according to claim 65 wherein the computer readable program code means comprises:
computer readable means for providing instructions for sending a message to the other terminal set indicating that the call is to be parked at the other terminal set.

67. An article of manufacture according to claim 65 wherein the computer readable program code means comprises:
computer readable means for receiving from a first user interface a request to park the call, the reference being generated in response to the request; and
computer readable means for providing the reference to a second user interface for display of the reference.

68. An article of manufacture comprising:
a computer usable medium having computer readable program code means embodied therein for a terminal set adapted to process a call at the terminal set, the computer readable code means in said article of manufacture comprising:
computer readable code means for generating a reference to the call for use in a call park pickup of the call; and
computer readable code means for participating in parking the call at one of the terminal set and the other terminal set,
wherein the other terminal set is a first other terminal set and wherein the reference to the call is generated in response to receiving a first message from the first other terminal set indicating the call is to be parked, the computer readable program code means comprising:
a) computer readable means for responsive to receiving the first message:
i) storing the reference to the call; and
ii) sending a second message to the first other terminal set containing the reference to the call; and
b) computer readable means for responsive to receiving a third message containing the reference to the call and a reference to a second other terminal set from the first other terminal set:
i) identifying the call using the reference to the call stored; and
ii) establishing a media path with the second other terminal set.

69. An article of manufacture comprising:
a computer usable medium having computer readable program code means embodied therein for a terminal set adapted to process a call at the terminal set, the computer readable code means in said article of manufacture comprising:

computer readable code means for generating a reference to the call for use in a call park pickup of the call; and computer readable code means for participating in parking the call at one of the terminal set and the other terminal set, wherein the reference to the call is generated in response to receiving a first message from a first other terminal set indicating the call is to be parked, the computer readable program code means comprising:

a) computer readable means for responsive to receiving the first message:

i) storing the reference to the call; and ii) sending a second message to the first other terminal set containing the reference to the call; and b) computer readable means for responsive to receiving a third message containing the reference to the call from a second other terminal set:

i) identifying the call using the reference to the call stored; and ii) establishing a media path with the second other terminal set.

70. An article of manufacture according to claim 67 wherein the other terminal set is a first other terminal set, the computer readable program code means comprising:

computer readable means for providing an other reference, the other reference being a reference to at least one terminal set of the terminal set and the first other terminal set; and computer readable means for displaying the other reference.

71. An article of manufacture according to claim 70 wherein the computer readable program code means comprises computer readable means for:

responsive to receiving the request, sending a message to the first other terminal set indicating that the call is to be parked at the first other terminal set.

72. An article of manufacture according to claim 69 wherein the other reference is a reference to the terminal set, the computer readable program code means comprising:

computer readable means for storing the reference to the call; and computer readable means for responsive to receiving a first message containing the reference to the call from a second other terminal set, sending a second message to the second other terminal set containing an identifier of the call and a reference to the first other terminal set.

73. An article of manufacture according to claim 72 wherein the second message contains information on the first other terminal set for use by the second other terminal set in establishing a media path with the first other terminal set.

74. An article of manufacture comprising:

a computer usable medium having computer readable program code means embodied therein for a terminal set adapted to process a call at the terminal set, the computer readable code means in said article of manufacture comprising:

computer readable code means for generating a reference to the call for use in a call park pickup of the call;

computer readable code means for participating in parking the call at one of the terminal set and a first other terminal set;

computer readable means for receiving from a first user interface a request to park the call, the reference being generated in response to the request;

computer readable means for providing the reference to a second user interface for display of the reference, computer readable code means for providing an other reference, the other reference being a reference to at least one terminal set of the terminal set and the first other terminal set; and computer readable code means for displaying the other reference, wherein the other reference is a reference to the terminal set, the computer readable program code means further comprising:

computer readable code means for storing the reference to the call; and computer readable code means for responsive to receiving a first message from a second other terminal set containing the reference to the call, identifying the call using the reference to the call stored and sending a second message to the first other terminal set containing a reference to the second other terminal set.

75. An article of manufacture according to claim 74 wherein the first message and the second message contain information on the second other terminal set for use by the first other terminal set in establishing a media path with the second other terminal set.

76. An article of manufacture according to claim 74 wherein the first message and the second message contain a call ID (IDentification) of a call leg between the terminal set and the second other terminal set.

77. An article of manufacture comprising:

a computer usable medium having computer readable program code means embodied therein for a terminal set adapted to process a call at the terminal set, the computer readable code means in said article of manufacture comprising:

computer readable code means for generating a reference to the call for use in a call park pickup of the call;

computer readable code means for participating in parking the call at one of the terminal set and a first other terminal set;

computer readable code means for receiving from a first user interface a request to park the call, the reference being generated in response to the request;

computer readable code means for providing the reference to a second user interface for display of the reference, computer readable means for providing an other reference, the other reference being a reference to at least one terminal set of the terminal set and the first other terminal set; and computer readable means for displaying the other reference, wherein the other reference is a reference to the terminal set, the computer readable program code means comprising:

computer readable code means for storing the reference to the call;

computer readable code means for responsive to receiving a first message from the second other terminal set containing the reference to the call, identifying the call using the reference to the call stored and sending a second message to the first other terminal set indicating that the call is to be picked up; and computer readable code means for responsive to receiving a third message from the first other terminal set in response to the second message, sending a fourth message containing an identifier of the call, the fourth message being sent to the second other terminal set for indicating to the second other terminal set that a media path is to be established with the first other terminal set.

78. An article of manufacture according to claim 77 wherein the first message and the second message contain information on the second other terminal set for use by the first other terminal set in establishing a media path with the second other terminal set and wherein the third message and the fourth message contain information on the first other terminal set for use by the second other terminal set in establishing a media path with the first other terminal set.

79. An article of manufacture according to claim 77 wherein the second message contains a reference to the second other terminal set for use by the first other terminal set in establishing a media path with the second other terminal set and wherein the fourth message contains a reference to the first other terminal set.

80. An article of manufacture according to claim 65 wherein the computer readable program code means comprises computer readable code means for: upon receipt of a message from a second other terminal set containing at least one incorrect reference to the call and an incorrect reference to the terminal set, sending a message to the second other terminal set indicating an error in the incorrect reference to the call.

81. An article of manufacture comprising:
a computer usable medium having computer readable program code means embodied therein for a terminal set adapted to process a call at the terminal set, the computer readable code means in said article of manufacture comprising:
computer readable code means for generating a reference to the call for use in a call park pickup of the call; and
computer readable code means for participating in parking the call at one of the terminal set and the other terminal set,
wherein the computer readable program code means comprises:
computer readable code means for responsive to receiving a user input containing a reference to a parked call between a first other terminal set of the parked call other than the terminal set and a second other terminal set of the parked call other than the terminal set and containing a reference to at least one terminal set of the first other terminal set of the parked call and the second other terminal set of the parked call, establishing a media path with the first other terminal set of the parked call, call park of the parked call being initiated at the second other terminal set of the parked call.

82. An article of manufacture according to claim 81 wherein the computer readable program code means comprises:
computer readable code means for sending a first message containing the reference to the parked call to the second other terminal set of the parked call; and
computer readable code means for responsive to receiving a second message containing a reference to the first other terminal set of the parked call and an identifier of the parked call, sending a third message to the first other terminal set of the parked call for establishing a media path with the first other terminal set of the parked call.

83. An article of manufacture according to claim 81 wherein the computer readable program code means comprises:
computer readable code means for sending a first message containing the reference to the parked call to the second other terminal set of the parked call; and
computer readable code means for responsive to receiving a second message from the first other terminal set of the parked call, establishing the media path with the first other terminal set of the parked call.

84. An article of manufacture according to claim 81 wherein the computer readable program code means comprises:
computer readable code means for sending a message containing the reference to the parked call to one of the first other terminal set of the parked call and the second other terminal set of the parked call for establishing the media path.

85. An article of manufacture comprising:
a computer usable medium having computer readable program code means embodied therein for a terminal set adapted to process a call at the terminal set, the computer readable code means in said article of manufacture comprising:
computer readable code means for generating a reference to the call for use in a call park pickup of the call;
computer readable code means for participating in parking the call at one of the terminal set and a first other terminal set;
computer readable code means for receiving from a first user interface a request to park the call, the reference being generated in response to the request; and
computer readable code means for providing the reference to a second user interface for display of the reference; and
computer readable code means for participating in call park pickup of a parked call between the terminal set and a first other terminal set of the parked call other than the terminal set by:
responsive to receiving a first message containing a reference to the call from one of the first other terminal set of the parked call and a second other terminal set of the parked call other than the terminal set, establishing a media path with the second other terminal set of the parked call for replacing the parked call with an other call with the second other terminal set of the parked call.

86. An article of manufacture according to claim 85 wherein the computer readable program code means comprises:
computer readable code means for:
prior to the parked call being parked, responsive to receiving a second message from the first other terminal set of the parked call indicating that the parked call is to be parked, park the parked call.

87. An article of manufacture according to claim 85 wherein the first message is from the second other terminal set of the parked call and the reference to the call is an identifier of the parked call.

88. An article of manufacture according to claim 85 wherein the first message is from the first other terminal set of the parked call and contains a reference to the second other terminal set of the parked call, the computer readable program code means comprising computer readable code means for sending a second message to the second other terminal set of the parked call containing information for establishing the media path.

89. An article of manufacture according to claim 85 wherein the first message is from the second other terminal set of the parked call.

90. An article of manufacture according to claim 89 wherein the computer readable program code means comprises:
computer readable code means for:
responsive to receiving a second message containing an identifier of the parked call from the first other terminal set of the parked call, sending a third message to the first other terminal set of the parked call containing the identifier and information for establishing the media path with the second other terminal set of the parked call.

91. An article of manufacture according to claim 85 wherein the computer readable program code means comprises:

computer readable code means for:

responsive to receiving a second message containing an identifier of the parked call and a reference to the second other terminal set of the parked call from the first other terminal set of the parked call, sending a third message to the second other terminal set of the parked call containing information for establishing the media path with the second other terminal set of the parked call.

92. An article of manufacture according to claim 65 wherein the terminal set is one of a packet based telephone, a video phone, a PC (Personal Computer), a PDA (Personal Digital Assistant), a soft phone, a wireless device, and a wireless telephone.

93. An article of manufacture according to claim 65 wherein the terminal set is a VoIP (Voice over Internet Protocol) telephone.

94. A method of processing a call between a first terminal set and a second terminal set, the method comprising:

at the first terminal set, generating a reference to the call for use in a call park pickup of the call, the first terminal set participating in parking the call at one of the first terminal set and the second terminal set; and picking up the parked call from a third terminal set using the reference to the call.

95. A system comprising first, second and third terminal sets, each adapted to process a call, the first terminal set comprising a call park function adapted to generate a reference to the call for use in a call park pickup of the call, and participate in parking the call at one of the first terminal set and the second terminal set; and the third terminal set comprising a call pickup function for picking up the call parked at the one of the first terminal set and the second terminal set.

96. An article of manufacture comprising:

a computer usable medium having computer readable program code means embodied therein for processing a call between at least a first terminal set and a second terminal set, the computer readable code means including:

computer readable code means for, at the first terminal set, generating a reference to the call for use in a call park pickup of the call, the first terminal set participating in parking the call at one of the first terminal set and the second terminal set; and computer readable code means for allowing the parked call to be picked up from a third terminal set using the reference to the call.

* * * * *